US010163587B2

(12) United States Patent
Lee et al.

(10) Patent No.: US 10,163,587 B2
(45) Date of Patent: Dec. 25, 2018

(54) INTERLOCK DEVICE OF WITHDRAWABLE ARC ELIMINATOR

(71) Applicant: LSIS CO., LTD., Anyang-si, Gyeonggi-do (KR)

(72) Inventors: Hyunwook Lee, Anyang-si (KR); Kwanghyeon Ahn, Anyang-si (KR); Seogwon Lee, Anyang-si (KR); Youngwoo Jeong, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 217 days.

(21) Appl. No.: 15/211,337

(22) Filed: Jul. 15, 2016

(65) Prior Publication Data
US 2017/0263389 A1    Sep. 14, 2017

(30) Foreign Application Priority Data
Mar. 11, 2016  (KR) .................. 10-2016-0029769

(51) Int. Cl.
*H01H 9/30*   (2006.01)
*H02B 11/133*   (2006.01)
*H02B 11/28*   (2006.01)

(52) U.S. Cl.
CPC ............ *H01H 9/30* (2013.01); *H02B 11/133* (2013.01); *H02B 11/28* (2013.01)

(58) Field of Classification Search
CPC ................. H01H 9/30; H02B 11/133; H02B 11/00–11/28
See application file for complete search history.

(56) References Cited

U.S. PATENT DOCUMENTS

| 4,427,854 | A | * | 1/1984 | Kleinecke | H02B 11/133 200/50.21 |
|---|---|---|---|---|---|
| 5,097,382 | A | * | 3/1992 | Leach | H02B 11/127 361/615 |
| 5,206,468 | A | * | 4/1993 | Kobayashi | H02B 11/133 200/50.23 |
| 9,843,172 | B2 | * | 12/2017 | Yang | H02B 11/10 |
| 2004/0212943 | A1 | * | 10/2004 | Yoon | H02B 11/133 361/115 |
| 2005/0155153 | A1 | * | 7/2005 | Falwell | A61G 7/075 5/646 |

(Continued)

FOREIGN PATENT DOCUMENTS

| CN | 204315988 U | 5/2015 |
|---|---|---|
| CN | 204424778 U | 6/2015 |

(Continued)

OTHER PUBLICATIONS

Korean Search Report dated Oct. 8, 2015, 4 pages.
European Patent Office Application Serial No. 16179433.4, Search Report dated May 26, 2017, 6 pages.
Korean Intellectual Property Office Application No. 10-2016-0029769, Office Action dated May 22, 2017, 20 pages.
Chinese Office Action for related Chinese Application No. 201610811649.0; action dated Jul. 4, 2018; (6 pages).

*Primary Examiner* — Ronald W. Leja
*Assistant Examiner* — Christopher Clark
(74) *Attorney, Agent, or Firm* — K&L Gates LLP

(57) ABSTRACT

The present invention relates to a withdrawable arc eliminator having an interlock function, and more particularly, to a withdrawable arc eliminator having an interlock function capable of preventing insertion or withdrawal of an arc eliminator applied to an electrical panel, in a closed state of the arc eliminator.

10 Claims, 21 Drawing Sheets

(56) References Cited

U.S. PATENT DOCUMENTS

| | | | | |
|---|---|---|---|---|
| 2006/0219665 | A1* | 10/2006 | Zhou | H01H 9/168 218/122 |
| 2007/0175866 | A1* | 8/2007 | Tsuchiya | H01H 31/003 218/10 |
| 2010/0089874 | A1* | 4/2010 | Morita | H01H 9/22 218/154 |
| 2010/0230256 | A1* | 9/2010 | Lee | H02B 11/133 200/50.21 |
| 2010/0326799 | A1* | 12/2010 | Park | H02B 11/133 200/50.25 |
| 2012/0228096 | A1* | 9/2012 | Kobayashi | H02B 11/133 200/50.22 |
| 2013/0020182 | A1* | 1/2013 | Bozek | H02B 11/26 200/50.21 |
| 2015/0318122 | A1* | 11/2015 | Frye | H02B 1/04 235/382 |

FOREIGN PATENT DOCUMENTS

| | | |
|---|---|---|
| EP | 2228878 | 9/2010 |
| JP | H11283472 | 10/1999 |
| JP | 2002075136 | 3/2002 |
| JP | 2014056731 | 3/2014 |
| KR | 100356512 | 10/2002 |
| KR | 1020100102490 | 9/2010 |
| KR | 20150089732 | 8/2015 |
| WO | 2011116985 | 9/2011 |

\* cited by examiner

INTERLOCK DEVICE OF WITHDRAWABLE ARC ELIMINATOR

CROSS-REFERENCE TO RELATED APPLICATION

Pursuant to 35 U.S.C. § 119(a), this application claims the benefit of earlier filing date and right of priority to Korean Application No. 10-2016-0029769, filed on Mar. 11, 2016, the contents of which are all hereby incorporated by reference herein in its entirety.

BACKGROUND OF THE INVENTION

1. Field of the Invention

The present invention relates to a withdrawable arc eliminator having an interlock function, and more particularly, to a withdrawable arc eliminator having an interlock function capable of preventing insertion or withdrawal of an arc eliminator applied to an electrical panel, in a closed state of the arc eliminator.

2. Background of the Invention

Generally, an electrical panel is facility to supply received power to a load system installed on each consumer side. The electrical panel may distribute power of a high voltage after converting into power of a low voltage. A switchgear, an arrester, a transformer, a circuit breaker, various types of measuring devices, etc. may be provided in the electrical panel.

An arc eliminator may be installed in the electrical panel. The arc eliminator, which may be inserted into or withdrawn from the electrical panel, is called a withdrawable arc eliminator. The withdrawable arc eliminator is connected to a busbar and a ground busbar of the electrical panel when inserted into a distribution board. In the inserted state, normally the withdrawable arc eliminator maintains two electrodes (a high voltage electrode and a ground electrode) disposed therein in an open state (non-conducted state, insulating state). Then, when an arc accident occurs from the electrical panel, the withdrawable arc eliminator rapidly moves to apply a current to the two electrodes, thereby grounding a system and eliminating an arc.

The arc eliminator may include an arc extinguishing unit, and the arc extinguishing unit may be insulated by an insulating material since inactive insulating gas having an excellent insulating property ($SF_6$) is filled in a case. The arc extinguishing unit may be installed such that two electrodes (a high voltage electrode and a ground electrode) may be spaced apart from each other in a case formed of an insulating material. Alternatively, the arc extinguishing unit may be installed such that a movable electrode may have a position change in the case. The high voltage electrode of the arc extinguishing unit may be connected to a fixed busbar of the electrical panel, so power of a high voltage may be always applied to the high voltage electrode.

The ground electrode of the arc extinguishing unit may be connected to a ground of a distribution board installation region through a ground busbar or a ground cable.

The arc eliminator may operate in a closing mode where a current is applied to the high voltage electrode and the ground electrode by a movable electrode, and in an opening mode (or a restoration mode) where an insulating state between the high voltage electrode and the ground electrode is maintained as the movable electrode is separated from the high voltage electrode or the ground electrode.

The movable electrode of the arc extinguishing unit may move to contact each of the high voltage electrode and the ground electrode in a closing mode, thereby applying a current to the high voltage electrode and the ground electrode. The movable electrode of the arc extinguishing unit may move not to contact at least one of the high voltage electrode and the ground electrode in an opening mode (or a restoration mode), thereby insulating the high voltage electrode and the ground electrode from each other.

However, the conventional withdrawable arc eliminator may have the following problem.

When the arc eliminator is in a closed state, i.e., when the high voltage electrode and the ground electrode of the arc eliminator are in a conducted state, if the withdrawable arc eliminator moves forward or backward, an arc accident may occur.

A related prior art may be disclosed in Korean Laid-Open Patent Publication No. 10-2015-0089732A.

SUMMARY OF THE INVENTION

Therefore, an aspect of the detailed description is to provide a withdrawable arc eliminator having an interlock function capable of preventing insertion or withdrawal of an arc eliminator and capable of minimizing an arc accident, when the withdrawable arc eliminator is in a closed state.

To achieve these and other advantages and in accordance with the purpose of this specification, as embodied and broadly described herein, there is provided a withdrawable arc eliminator having an interlock function, including: an arc eliminator body; and a carriage module configured to move the arc eliminator body, wherein the carriage module includes: an insertion and withdrawal screw; a truck moved by the insertion and withdrawal screw; a movable pin installed at part of the truck so as to be moveable up and down; and a movable pin lifter backward-moved by being pushed by a handle for rotating the insertion and withdrawal screw, and configured to upward-move the movable pin, and wherein the arc eliminator body includes: a housing having a space; an arc extinguisher installed at the housing, and including a moving rod disposed to move to the space back and forth; a fixed body disposed at the space, and having an insertion opening for inserting the movable pin thereinto; an interlock body disposed to be moveable to a first position between the insertion opening and the movable pin, and a second position except for the first position between the insertion opening and the movable pin; and an interlock body moving member operated by interworking with the moving rod, and configured to move the interlock body to the first position or the second position.

The interlock body moving member may include a link configured to move the interlock body to the first position when the arc extinguisher is in a closed state.

The link may include: a rotation shaft installed at the housing; a first link installed at the rotation shaft, and contacting an end portion of the moving rod; and a second link installed at the rotation shaft, and configured to move the interlock body back and forth.

The interlock body may include: a fore end contact portion contacting a front part of an end portion of the second link; and a rear end contact portion contacting a rear part of the end portion of the second link. A distance between the fore end contact portion and the rear end contact portion may be greater than a front and rear width of the end portion of the second link.

The interlock body may further include a protrusion protruding from one of the fore end contact portion and the rear end contact portion, the protrusion spaced apart from another of the fore end contact portion and the rear end contact portion.

The interlock body may further include: a guide portion guided to the fixed body; and a movable pin contact portion protruding from the guide portion, and contacting an upper end of the movable pin when the movable pin moves upward. The guide portion may be formed to be longer than the movable pin contact portion back and forth.

The housing may be provided with a lower through hole at a lower plate portion thereof, the lower through hole through which a movable pin guide for guiding an upward-and-downward movement of the movable pin passes.

The fixed body may include: a first body part disposed at the space in a vertical state; and a second body part formed at a region of the first body part in a horizontal state, and having the insertion opening which is disposed above the movable pin.

The arc eliminator body may further include one or more interlock body guides may be installed at the fixed body and configured to guide a linear movement of the interlock body.

A slit, guided by the interlock body guide, may be formed at the interlock body to be long back and forth.

The present invention may have the following advantages.

Firstly, when the arc eliminator is in a closed state, the arc eliminator body is restricted from moving by the handle. This may prevent an arc accident occurring when the arc eliminator body moves in a closed state of the arc eliminator body.

Secondly, an arc accident may be prevented through a simple configuration of the interlock body and the interlock body moving member interworked with the moving rod.

Thirdly, separation of the interlock body moving member and the interlock body from each other may be prevented.

Fourthly, the interlock body may be moved stably with high reliability.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of preferred configurations of a withdrawable arc eliminator having an interlock function according to the present invention, with reference to the accompanying drawings.

Figure 1:
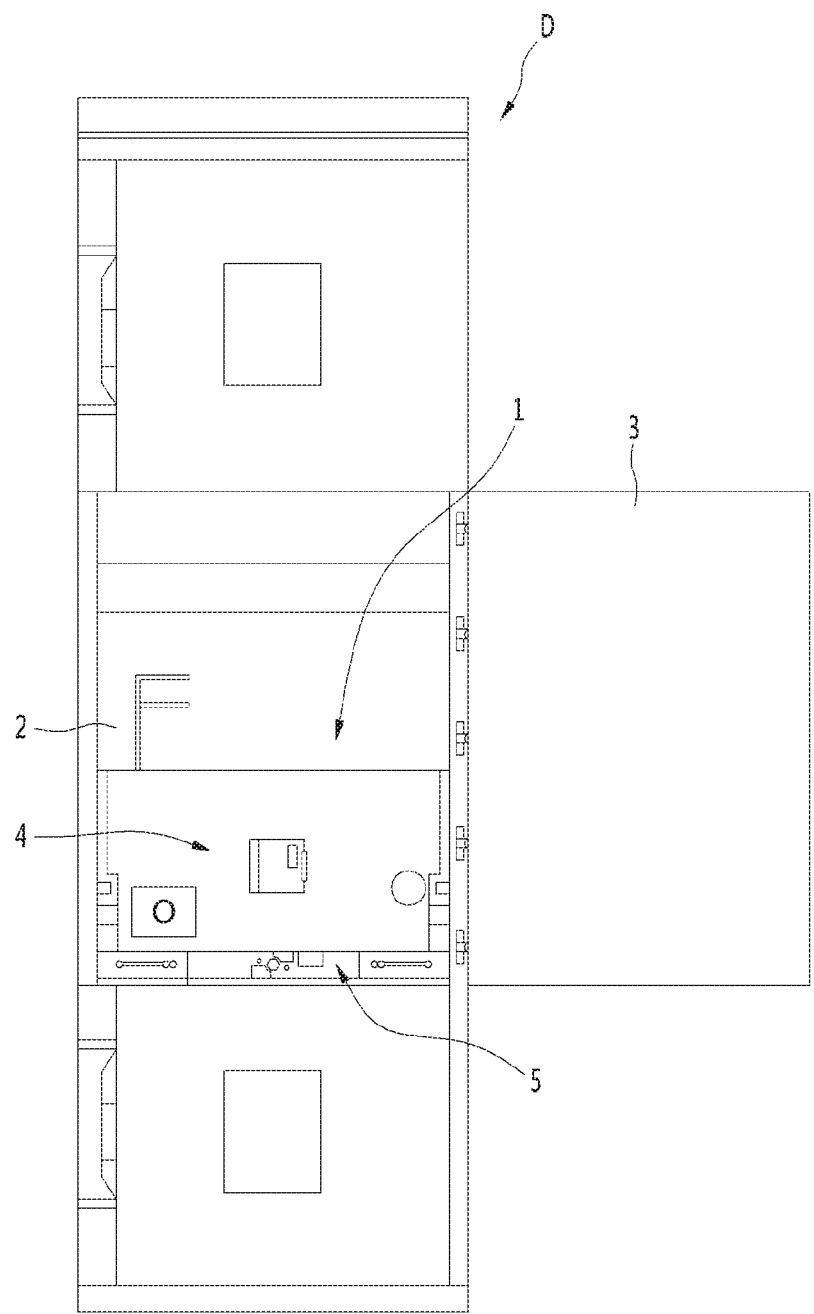
FIG. 1 is a frontal view of a distribution board having a withdrawable arc eliminator having an interlock function according to an embodiment of the present invention.
Figure 2:
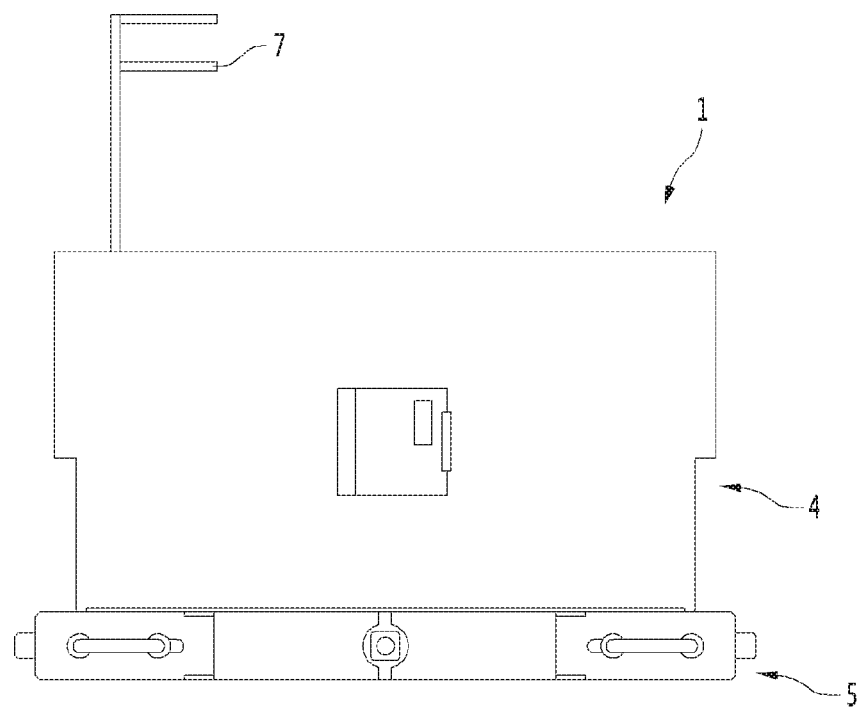
FIG. 2 is a frontal view showing a withdrawable arc eliminator having an interlock function according to an embodiment of the present invention, in an enlarged manner.
Figure 3:
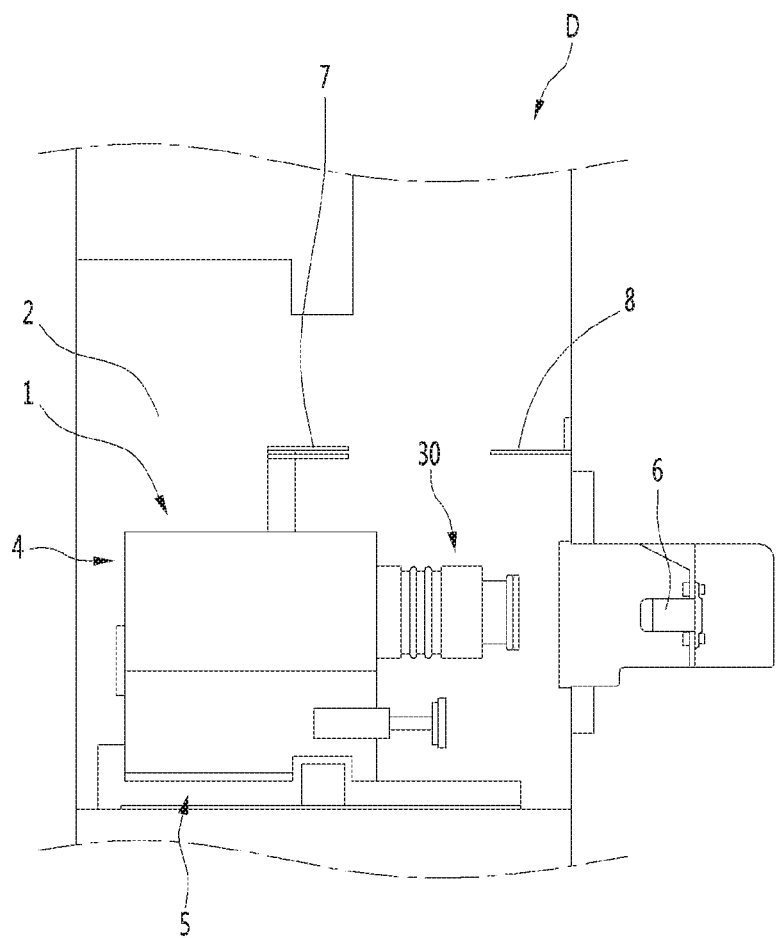
FIG. 3 is a side sectional view illustrating the inside of a distribution board when a withdrawable arc eliminator having an interlock function according to an embodiment of the present invention is on a withdrawal position.
Figure 4:
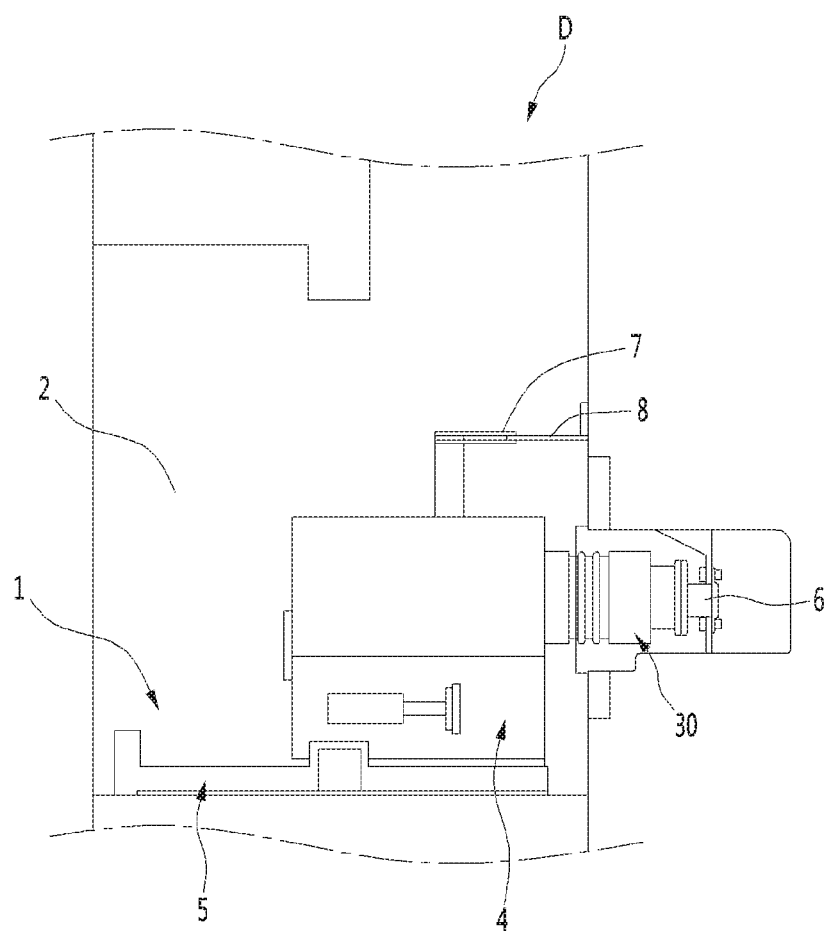
FIG. 4 is a side sectional view illustrating the inside of a distribution board when a withdrawable arc eliminator having an interlock function according to an embodiment of the present invention is on an insertion position.

FIG. 1 is a frontal view of a distribution board having a withdrawable arc eliminator having an interlock function according to an embodiment of the present invention. FIG. 2 is a frontal view showing a withdrawable arc eliminator having an interlock function according to an embodiment of the present invention, in an enlarged manner. FIG. 3 is a side sectional view illustrating the inside of a distribution board when a withdrawable arc eliminator having an interlock function according to an embodiment of the present invention is on a withdrawal position. And FIG. 4 is a side sectional view illustrating the inside of a distribution board when a withdrawable arc eliminator having an interlock function according to an embodiment of the present invention is on an insertion position.

An arc eliminator accommodation chamber 2, configured to accommodate a withdrawable arc eliminator 1 therein, may be formed at a distribution board (D). The distribution board may include a door 3 configured to open and close the arc eliminator accommodation chamber 2.

The withdrawable arc eliminator 1 (hereinafter, will be referred to as 'arc eliminator') includes an arc eliminator body 4, and a carriage module 5 configured to move the arc eliminator body 4.

The arc eliminator body 4 may be disposed on the carriage module 5. And the arc eliminator body 4 may move to an insertion position by backward-moving on the carriage module 5, or may move to a withdrawal position by forward-moving on the carriage module 5.

The arc eliminator 1 may include an arc extinguisher 30 configured to extinguish an arc. The arc extinguisher 30 may be provided at the arc eliminator body 4, and may constitute part of the arc eliminator body 4.

As shown in FIGS. 3 and 4, a fixed busbar 6 (distribution board busbar), to which the arc extinguisher 30 is connected or from which the arc extinguisher 30 is separated, may be provided in the distribution board.

The arc extinguisher 30 may be provided at a rear side of the arc eliminator body 4, in a backward-protruding manner. When the arc eliminator body 4 is on a forward-moving position (or a withdrawal position), the arc extinguisher 30 and the fixed busbar 6 may be separated from each other. On the other hand, when the arc eliminator body 4 is on a backward-moving position (or an insertion position), the arc extinguisher 30 and the fixed busbar 6 may be connected to each other.

A ground contact 7 may be provided at one side of the arc eliminator body 4. The ground contact 7 may be disposed above the arc eliminator body 4 in a protruding manner. A ground busbar 8 connected to the ground contact 7 may be provided in the distribution board (D).

When the arc eliminator body 4 is on a forward-moving position (or a withdrawal position) as shown in FIG. 3, the ground contact 7 may be separated from the ground busbar 8. On the other hand, when the arc eliminator body 4 is on a backward-moving position (or an insertion position) as shown in FIG. 4, the ground contact 7 may contact the ground busbar 8.

The carriage module 5 may move the arc eliminator body 4 to a withdrawal position as shown in FIG. 3, or may move the arc eliminator body 4 to an insertion position as shown in FIG. 4. The withdrawal position may be a position where the arc extinguisher 30 of the arc eliminator body 4 is separated from the fixed busbar 6, and the insertion position may be a position where the arc extinguisher 30 of the arc eliminator body 4 is connected to the fixed busbar 6.

A sensing unit (not shown) configured to sense an arc accident, such as a light sensor, may be installed in the distribution board (D). Once an arc accident is sensed by the sensing unit, an arc protection relay (not shown) installed at the distribution board (D) may output a control signal to an arc eliminator controller (not shown) installed at the distribution board (D).

The arc eliminator controller may control the arc eliminator 1 to be in a closed state. That is, the arc eliminator controller may control the arc extinguisher 30 of the arc eliminator 1 to be in a closed state.

Figure 5:
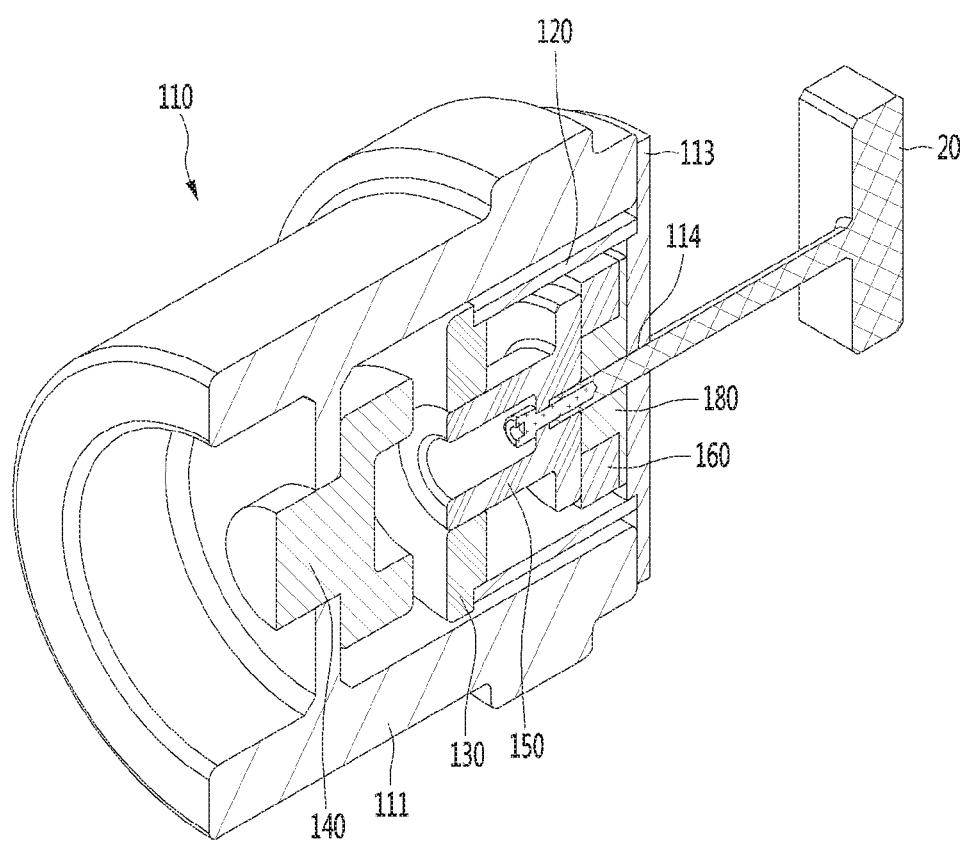
FIG. 5 is a partial cut-out perspective view illustrating an example of an arc extinguisher of a withdrawable arc eliminator having an interlock function according to an embodiment of the present invention.
Figure 6:
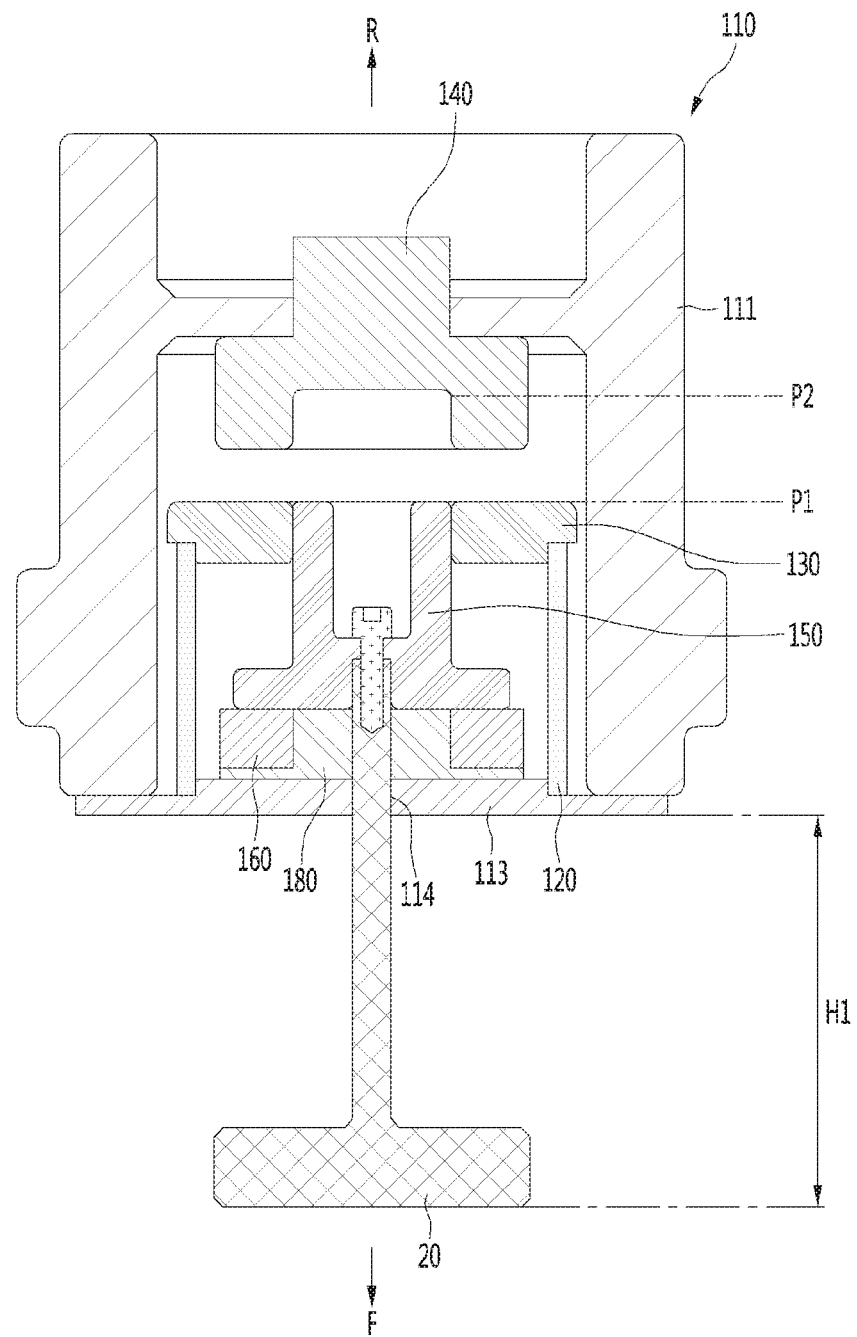
FIG. 6 is a sectional view illustrating an example of an arc extinguisher of a withdrawable arc eliminator having an interlock function according to an embodiment of the present invention, which shows an open state of the arc extinguisher.
Figure 7:
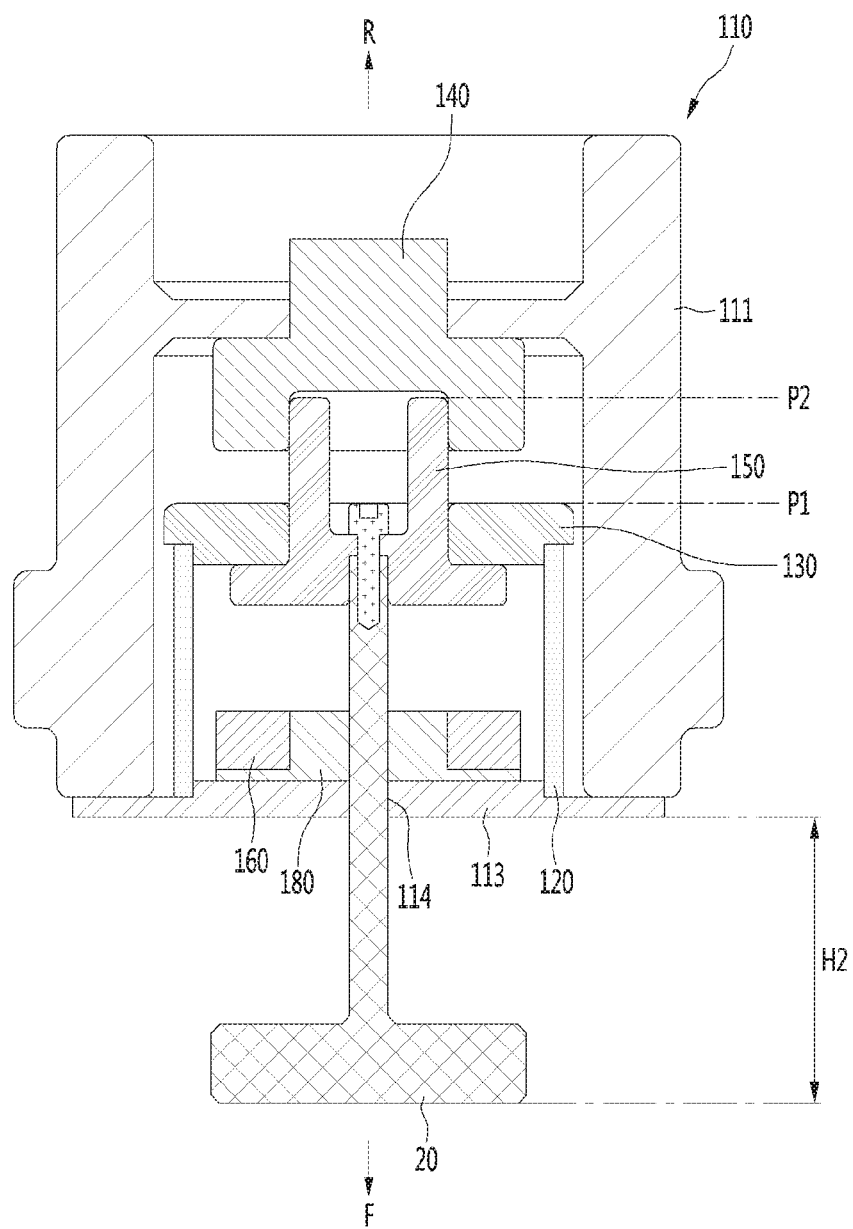
FIG. 7 is a sectional view illustrating an example of an arc extinguisher of a withdrawable arc eliminator having an interlock function according to an embodiment of the present invention, which shows a closed state of the arc extinguisher.

FIG. 5 is a partial cut-out perspective view illustrating an example of an arc extinguisher of a withdrawable arc eliminator having an interlock function according to an embodiment of the present invention. FIG. 6 is a sectional view illustrating an example of an arc extinguisher of a withdrawable arc eliminator having an interlock function according to an embodiment of the present invention, which shows an open state of the arc extinguisher. FIG. 7 is a sectional view illustrating an example of an arc extinguisher of a withdrawable arc eliminator having an interlock function according to an embodiment of the present invention, which shows a closed state of the arc extinguisher.

The arc extinguisher 30 may be a high speed closing switch assembly which can be in a closed state at a high speed.

The arc extinguisher 30 may include a case 110, a ground electrode 130 disposed in the case 110, a high voltage electrode 140 disposed in the case 110, a movable electrode 150 disposed in the case 110, and a movable electrode moving unit 160 configured to move the movable electrode 150 forward or backward.

The arc extinguisher 30 may include a moving rod 20 operated to move forward or backward together with the movable electrode 150. Part of the moving rod 20 may be disposed in the case 110, thereby being connected to the movable electrode 150. And another part of the moving rod 20 may protrude to the outside of the case 110.

The case 110 may have a hermetic inner space such that insulating gas may be filled therein. The case 110 may be formed such that a front surface and a rear surface thereof may be open. The case 110 may include a body portion 111 forming appearance, and a front case 113 formed at a front part of the body portion 111 so as to cover the open front surface of the body portion 111.

The arc extinguisher 30 may further include a pipe 120 disposed in the case 110. The pipe 120 may be disposed at a rear side of the front case 113, and may be disposed to enclose at least part of the ground electrode 130. The pipe 120 serves to protect the ground electrode 130 in an enclosing manner, and serves as a conductor since it is formed of a conductive material.

The ground electrode 130 may be coupled to a rear part of the pipe 120.

The high voltage electrode 140 may be provided at an inner rear part of the case 110.

The high voltage electrode 140 and the ground electrode 130 may be spaced from each other in the case 110 back and forth.

The ground electrode 130 may be electrically connected to the ground contact 7 shown in FIGS. 3 and 4, directly or through an additional connector. As shown in FIGS. 3 and 4, the high voltage electrode 140 may contact the fixed busbar 6 installed in the distribution board, directly or through an additional contactor.

The movable electrode 150 is provided in the case 110 so as to be moveable.

The movable electrode 150 may move to an opening position (P1) where the ground electrode 130 and the high voltage electrode 140 are not connected to each other, as shown in FIG. 6. Alternatively, the movable electrode 150 may move to a closing position (P2) where the ground electrode 130 and the high voltage electrode 140 are connected to each other, as shown in FIG. 7.

The movable electrode 150 may be disposed to contact a hollow inner wall of the ground electrode 130, and to be moveable in the case 110 back and forth. The movable electrode 150 may move in a front direction (F) to move to the opening position (P1), and may move in a rear direction (R) to move to the closing position (P2).

The movable electrode moving unit 160 may include an actuator configured to move the movable electrode 150 forward or backward.

The actuator may be controlled by the arc eliminator controller (not shown) installed at the distribution board (D). Once a closing signal is input to the actuator from the arc eliminator controller, the actuator may generate an electromagnetic force to linearly-move the movable electrode 150.

The actuator may be configured as a Thomson coil actuator. The Thomson coil actuator may be formed as a coil is wound in a ring shape. Once a power is applied to the Thomson coil actuator, the Thomson coil actuator may generate an electromagnetic force.

Once a power is applied to the Thomson coil actuator, an electromagnetic force may be generated as a current flows on the coil wound in a ring shape. The movable electrode 150 may move to the closing position (P2) from the opening position (P1), or may move to the opening position (P1) from the closing position (P2) by the generated electromagnetic force.

The actuator may be provided at a supporting member 180 disposed on a rear surface of the front case 113 of the case 110.

An electric circuit inside an incoming panel, a distribution board, or an electrical panel may be connected to a ground side by the high voltage electrode 140, the ground electrode 130 and the movable electrode 150. Once an accident current such as an arc occurs on the electric circuit, the accident current may rapidly flow to the ground side by making a detour, without flowing to the electric circuit.

The moving rod 20 may be disposed such that its one end may be coupled to the movable electrode 150, and its another end protrudes to the outside of the case 110. A through hole 114 for passing the moving rod 20 therethrough is formed at the front case 113 of the case 110. The moving rod 20 may be inserted into the through hole 114 such that a part thereof may be fixedly-connected to the movable electrode 150, and another part thereof may protrude to the outside of the case 110.

In a case where the movable electrode 150 has completely moved to the closing position (P2) as shown in FIG. 7, part of the moving rod 20 protrudes to the outside of the case 110.

In a case where the movable electrode 150 is on the opening position (P1) as shown in FIG. 6, the moving rod 20 protrudes to the outside of the case 110 by a first length (H1).

In a case where the movable electrode 150 is on the closing position (P2) as shown in FIG. 7, the moving rod 20 may move into the case 110 together with the movable electrode 150. In this case, the moving rod 20 may protrude to the outside of the case 110 by a second length (H2) obtained by deducting a moving distance of the movable electrode 150 from the first length (H1).

A moving rod driving unit (not shown) configured to push the moving rod 20 in a front direction (F) may be installed at the arc eliminator 1. And the moving rod driving unit may move the moving rod 20 in the front direction (F), thereby moving the movable electrode 150 fixedly-connected to one end of the moving rod 20, to the opening position (P1) shown in FIG. 6.

Figure 8:
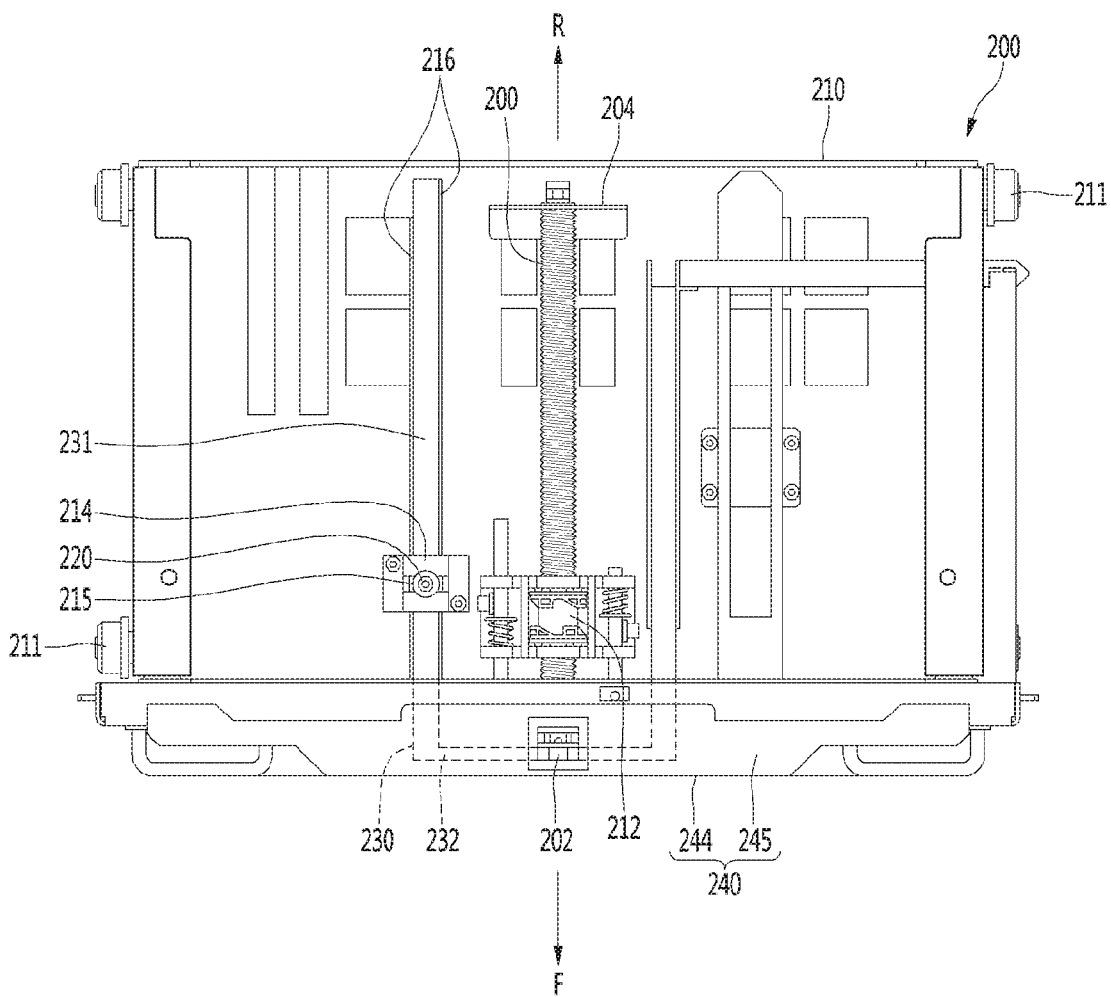
FIG. 8 is a planar view illustrating a carriage module of a withdrawable arc eliminator having an interlock function according to an embodiment of the present invention.
Figure 9:
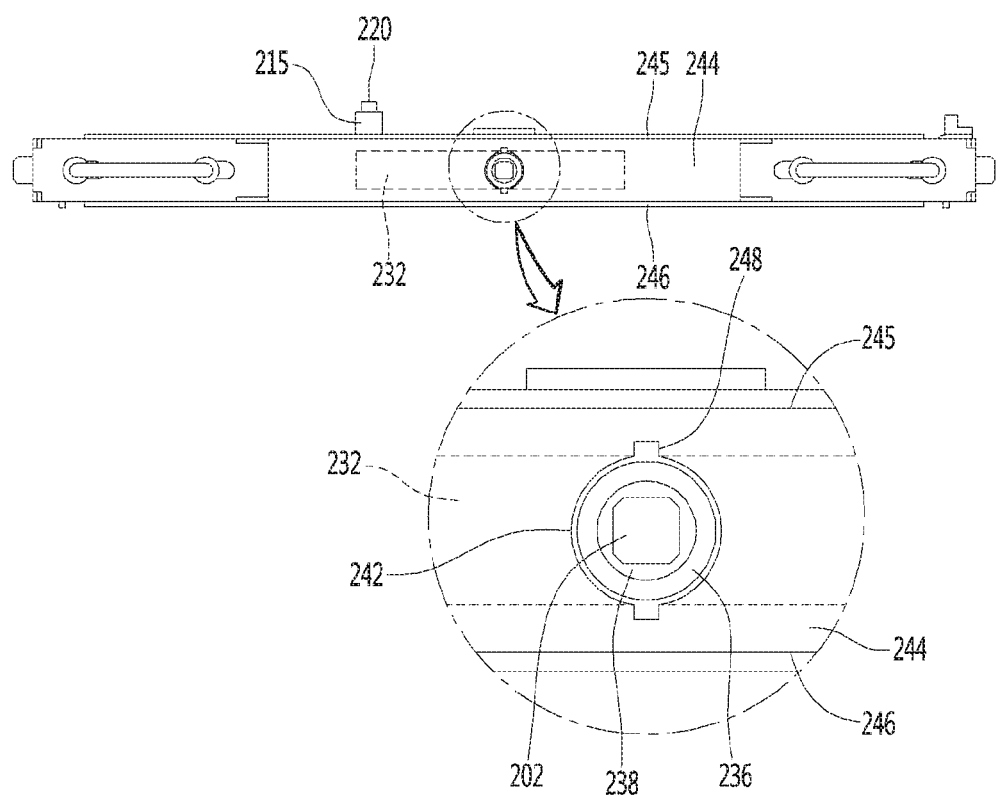
FIG. 9 is a frontal view illustrating a carriage module of a withdrawable arc eliminator having an interlock function according to an embodiment of the present invention, in an enlarged manner.
Figure 10:
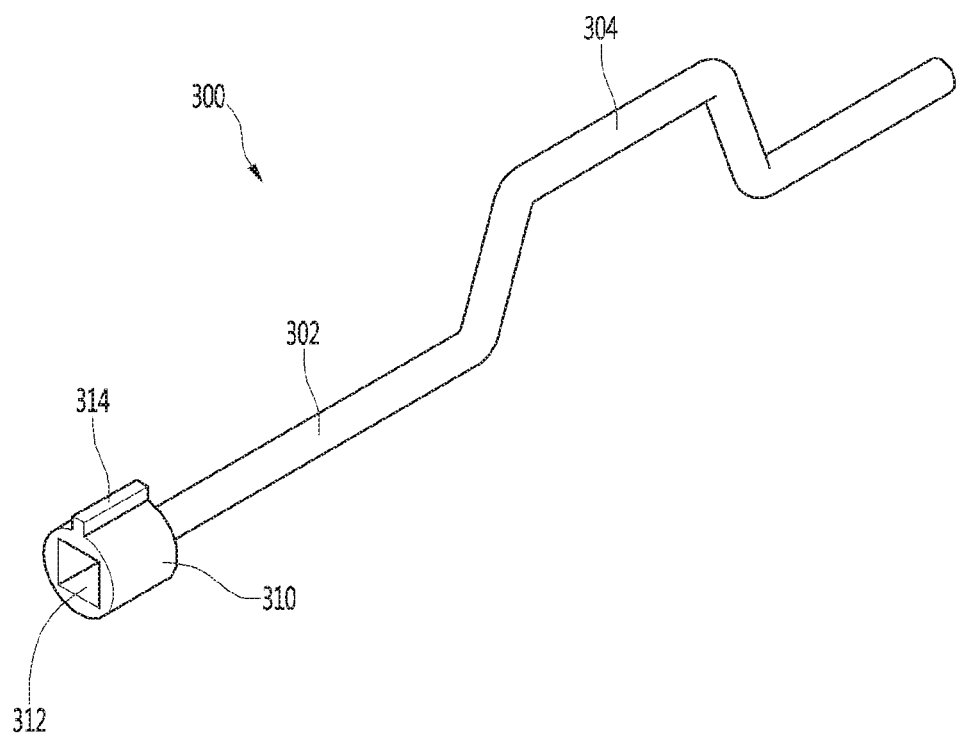
FIG. 10 is a perspective view illustrating a handle for operating the carriage module shown in FIGS. 8 and 9.
Figure 11:
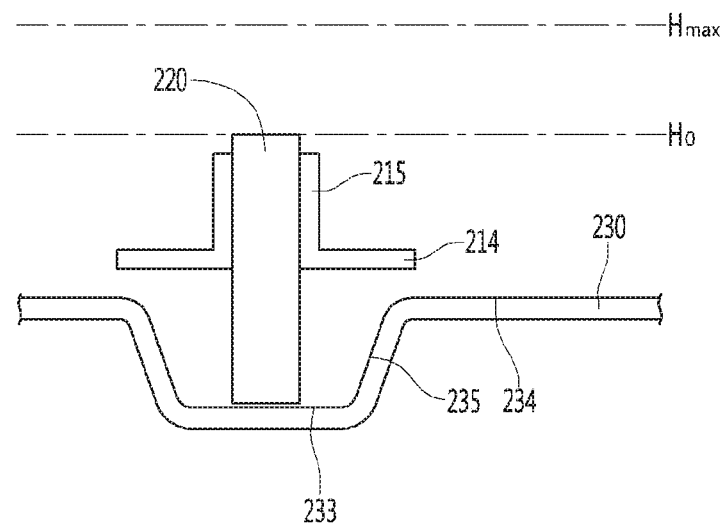
FIG. 11 is a sectional view illustrating a movable pin lifter when a movable pin shown in FIGS. 8 and 9 is on a lowered position.
Figure 12:
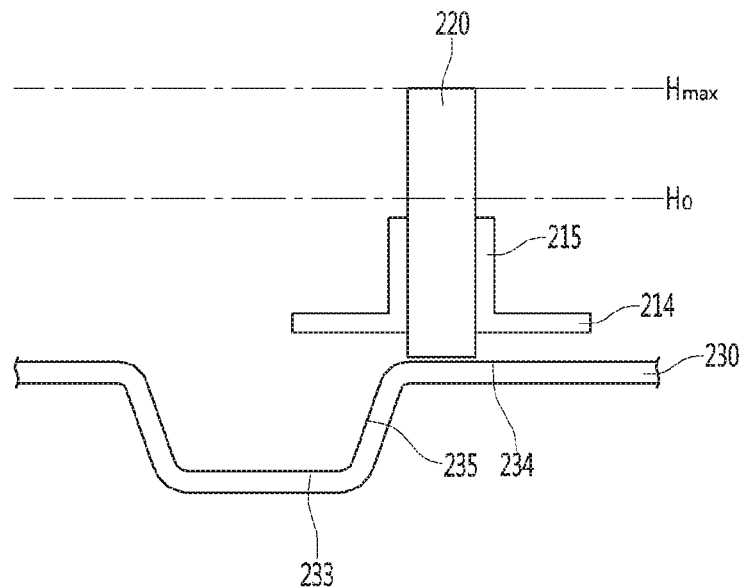
FIG. 12 is a sectional view illustrating the movable pin lifter when the movable pin shown in FIGS. 8 and 9 is on a raised position.

FIG. 8 is a planar view illustrating a carriage module of a withdrawable arc eliminator having an interlock function according to an embodiment of the present invention. FIG. 9 is a frontal view illustrating a carriage module of a withdrawable arc eliminator having an interlock function according to an embodiment of the present invention, in an enlarged manner. FIG. 10 is a perspective view illustrating a handle for operating the carriage module shown in FIGS. 8 and 9. FIG. 11 is a sectional view illustrating a movable pin lifter when a movable pin shown in FIGS. 8 and 9 is on a lowered position. FIG. 12 is a sectional view illustrating the movable pin lifter when the movable pin shown in FIGS. 8 and 9 is a raised position.

The carriage module 5 may include an insertion and withdrawal screw 200, a truck 210 moved by the insertion and withdrawal screw 200 and configured to move the arc eliminator body 4, a movable pin 220, and a movable pin lifter 230 backward-moved by being pushed by a handle 300 for rotating the insertion and withdrawal screw 200, and configured to upward-move the movable pin 220.

The carriage module 5 may further include a front body 240 disposed at a front side of the truck 210. The front body 240 may be fixedly-disposed in the distribution board, and the truck 210 may move back and forth at a rear side of the front body 240.

The front body 240 may include a front plate portion 244, an upper plate portion 245 and a lower plate portion 246. The front plate portion 244 of the front body 240 may have a space at a rear side thereof. The front body 240 may have a space between the upper plate portion 245 and the lower plate portion 246 of the front body 240.

A handle inserting opening 242, configured to insert part of the handle 300, may be formed at the front body 240. The handle inserting opening 242 may be formed at the front plate portion 244 of the front body 240, so as to be open back and forth. At least one protrusion inserting openings 248 communicated with the handle inserting opening 242 may be formed at the front body 240.

As shown in FIG. 8, the insertion and withdrawal screw 200 may be disposed to be long back and forth. Part of the insertion and withdrawal screw 200 may be disposed to be long back and forth, in the truck 210. And a front part of the insertion and withdrawal screw 200 may be partially disposed at the space of the front body 240.

The insertion and withdrawal screw 200 may include a handle connection portion 202 protruded to a front direction.

The handle connection portion 202 may be formed at a fore end of the insertion and withdrawal screw 200. The handle connection portion 202 may be formed at a fore end of the insertion and withdrawal screw 200, with a protruded shape. The handle 300 may be inserted into the handle connection portion 202 to thus be coupled to the handle connection portion 202.

As shown in FIG. 9, the handle connection portion 202 may be inserted into the handle inserting opening 242. The handle connection portion 202 may be formed to have a polygonal shape such as a quadrangular shape or a pentagonal shape.

As shown in FIG. 8, a guide plate 204 guided to the truck 210 when the insertion and withdrawal screw 200 rotates, may be coupled to a rear end of the insertion and withdrawal screw 200. The guide plate 204 may be coupled to the insertion and withdrawal screw 200 by using a coupling member such as a screw The truck 210 may move the arc eliminator body 4 back and forth when the insertion and withdrawal screw 200 rotates. The arc eliminator body 4 may be disposed on the truck 210, and may move back and forth together with the truck 210.

At least one wheel 211 may be installed at the truck 210.

A movable member 212 movable back and forth by the insertion and withdrawal screw 200 may be installed at the truck 210. An inner screw engaged with the insertion and withdrawal screw 200 may be formed on an inner circumference of the movable member 212.

A movable pin guide 214, configured to guide the movable pin 220 to move up and down, may be installed at the truck 210. A movable pin guide hole, configured to guide the movable pin 220 when the movable pin 220 moves up and down, may be formed at the movable pin guide 214. The movable pin 220 may be positioned to pass through the movable pin guide hole of the movable pin guide 214. The movable pin guide 214 may be installed at the truck 210 by using a coupling member such as a screw.

An upper guide 215, configured to guide the movable pin 220 to move up and down, may upward-protrude from the movable pin guide 214. The upper guide 215 may be formed as a hollow body, and the movable pin 220 may move up and down by being guided by the upper guide 215. The movable pin guide hole may be formed at an upper plate of the movable pin guide 214 and in the upper guide 215, so as to be open up and down.

The movable pin guide 214 may include a pair of slide plates, an upper plate which connects the pair of side plates to each other, and a lower plate horizontally extended from each of the side plates.

The movable pin guide 214 may be disposed to enclose part of a movable pin lifter 230 and part of a movable pin lifter guide 216 to be explained later. The lower plate of the movable pin guide 214 may be coupled to the truck 210 by using a coupling member such as a screw. The upper guide 215 may upward-protrude from the upper plate of the movable pin guide 214.

The movable pin lifter guide 216, configured to guide the movable pin lifter 230, may be installed at the truck 210. The movable pin lifter guide 216 may be disposed to be long, next to the insertion and withdrawal screw 200, in parallel to the insertion and withdrawal screw 200. The movable pin lifter guide 216 may include a pair of plates facing each other, and the movable pin lifter 230 may move back and forth between the pair of plates of the movable pin lifter guide 216.

The movable pin 220 may be disposed at the truck 210 so as to be moveable up and down by the movable pin guide 214.

As shown in FIGS. 11 and 12, the movable pin 220 may be disposed such that a lower end thereof may be disposed on the movable pin lifter 230, and such that it may pass through the movable pin guide 214.

The movable pin lifter 230 may include a rear lifter 231. The rear lifter 231 may be formed to be long back and forth, thereby being guided by the movable pin lifter guide 216. The movable pin 220 may be disposed on the rear lifter 231, and may be moved up and down by the rear lifter 231.

The movable pin lifter 230 may include a front lifter 232. The front lifter 232 may be bent from a front part of the rear lifter 231, and may be formed to be long right and left.

As shown in FIGS. 11 and 12, the movable pin lifter 230 may include a lower guide portion 233, an upper guide portion 234, and a connection portion 235. The lower guide portion 233 may be formed at part of the movable pin lifter 230, and may be disposed on the lower guide portion 233 when the movable pin 22 is downward-moved.

The upper guide portion 234 may be disposed at a front side or a rear side of the lower guide portion 233, and may be formed such that its upper end may be higher than the lower guide portion 233.

The connection portion 235 may be formed to connect the lower guide portion 233 and the upper guide portion 234 to each other. The movable pin 220 may slide on the connection portion 235 when the movable pin lifter 230 moves back and forth.

The lower guide portion 233, the connection portion 235, and the upper guide portion 234 may be positioned at the rear lifter 231, sequentially back and forth.

As shown in FIG. 9, the movable pin lifter 230 may further include a fore end protrusion 236. The fore end protrusion 236 may protrude toward the handle inserting opening 242, and may be pushed in a rear direction (R) by the handle 300 inserted into the handle inserting opening 242.

The fore end protrusion 236 may protrude from the front lifter 232 in a front direction (F). A through hole 238 configured to pass the handle connection portion 202 therethrough may be formed at the fore end protrusion 236. The through hole 238 may be formed at the fore end protrusion 236 and the front lifter 232, so as to be open back and forth. And part of the handle connection portion 202 may be positioned in the front lifter 232 and the fore end protrusion 236.

As shown in FIG. 10, the handle 300 may include handgrips 302, 302 held by a user (operator), and a connection portion 310 formed at the handgrips 302, 304 and coupled to the handle connection portion 202 shown in FIG. 9.

The connection portion 310 may be provided with a space 312 therein, the space into which the handle connection portion 202 is inserted. The space 312 may be formed to be a little larger than the handle connection portion 202, or may be formed to have the same shape as the handle connection portion 202.

In order to rotate the insertion and withdrawal screw 200, the connection portion 310 may be formed to have a size large enough to be inserted into the handle inserting opening 242 shown in FIG. 9, and may be formed to have a shape proper enough to be inserted into the handle inserting opening 242.

A protrusion 314, guided by being inserted into the protrusion inserting opening 248 shown in FIG. 9, may protrude from the connection portion 310 in a circumferential direction. Once the connection portion 310 is inserted into the handle inserting opening 242, the protrusion 314 may be inserted into the protrusion inserting opening 248 to thus be guided to the protrusion inserting opening 248 back and forth.

Hereinafter, an operation of the carriage module 5 will be explained as follows.

Firstly, a user may insert the connection portion 310 into the handle inserting opening 242 with holding the handle 300. In this case, the protrusion 314 of the connection portion 310 may be inserted into the protrusion inserting opening 248 to thus be guided.

When the connection portion 310 is inserted into the handle inserting opening 242, a rear end of the connection portion 310 may push the fore end protrusion 236 of the movable pin lifter 230 in a rear direction (R), and the movable pin lifter 230 may be entirely moved in the rear direction (R). Once the connection portion 310 is deeply inserted into the handle inserting opening 242, the protrusion 314 of the connection portion 310 may be discharged out from the protrusion inserting opening 248 to thus be positioned at a rear side of the protrusion inserting opening 248. In this case, the connection portion 310 may be coupled to the handle connection portion 202.

When the connection portion 310 is inserted into the handle inserting opening 242, the movable pin lifter 230 may be moved backward by a predetermined distance, thereby upward-moving the movable pin 220 disposed at a low position (Ho) shown in FIG. 11, to a maximum height (Hmax) shown in FIG. 12. And the upward-movement of the movable pin 220 may be completed.

In this embodiment, a position of the protrusion 314 formed at the connection portion 310, and whether the connection portion 310 is rotatable or not, may be changed according to an insertion depth of the connection portion 310. And a backward-moving distance of the movable pin lifter 230 may be changed according to an insertion depth of the connection portion 310, and a rise height of the movable pin 220 may be changed according to a backward-moving distance of the movable pin lifter 230.

For instance, in a case where the connection portion 310 is inserted into the handle inserting opening 242 by a first depth, the protrusion 314 of the connection portion 310 may completely pass through the protrusion inserting opening 248. This may allow the connection portion 310 to be rotatable.

In the case where the connection portion 310 is inserted into the handle inserting opening 242 by the first depth, the movable pin lifter 230 may be sufficiently moved backward. As a result, the movable pin lifter 230 may upward-move the movable pin 220 to a maximum height shown in FIG. 12.

However, in a case where the connection portion 310 is inserted into the handle inserting opening 242 by a second depth smaller than the first depth, the protrusion 314 of the connection portion 310 may not completely pass through the protrusion inserting opening 248, but may be partially positioned in the protrusion inserting opening 248. In this case, since the protrusion 314 is restricted to the protrusion inserting opening 248 in a rotation direction, rotation of the connection portion 310 may be restricted.

In the case where the connection portion 310 is inserted into the handle inserting opening 242 by the second depth smaller than the first depth, a backward-moving distance of the movable pin lifter 230 may be shorter than that when the connection portion 310 is inserted into the handle inserting opening 242 by the first depth. In this case, the movable pin 220 may not upward-move to the maximum height shown in FIG. 12.

On the contrary, in a specific condition where an arc accident may occur, the movable pin 220 may be restricted not to upward-move to the maximum height (Hmax), but to upward-move to a height lower than the maximum height (Hmax). In a specific condition where an arc accident may occur, the movable pin 220 may be restricted not to upward-move at a low height (Ho).

In this case, a rise height of the movable pin 220 is restricted, a moving distance of the movable pin lifter 230 in a rear direction (R) may be also restricted. In this case, the connection portion 310 may not be inserted into the handle inserting opening 242 by the first depth, and the protrusion 314 of the connection portion 310 may not completely pass through the protrusion inserting opening 248. This may restrict rotation of the handle 300, and forward and backward movements of the arc eliminator body 4.

In this embodiment, in a specific condition where an arc accident may occur, the movable pin 220 may be restricted not to upward-move to the maximum height. This may prevent front and rear movements of the arc eliminator body 4 through the handle, and may minimize an arc accident.

In this embodiment, when the arc extinguisher 30 is in a closed state as shown in FIG. 7, the movable pin 220 may be interlocked not to upward-move to the maximum height (Hmax). On the contrary, when the arc extinguisher 30 is in an open state as shown in FIG. 6, the interlocked state of the movable pin 220 may be released such that the movable pin 220 upward moves to the maximum height (Hmax).

In this embodiment, the movable pin 220 may be interlocked by interworking with the arc extinguisher 30, in a state where a driving source such as a motor is not additionally installed.

Hereinafter, an operation to interlock and to release an interlocked-state of the movable pin 220 will be explained in more detail with reference to FIGS. 13 to 21.

Figure 13:
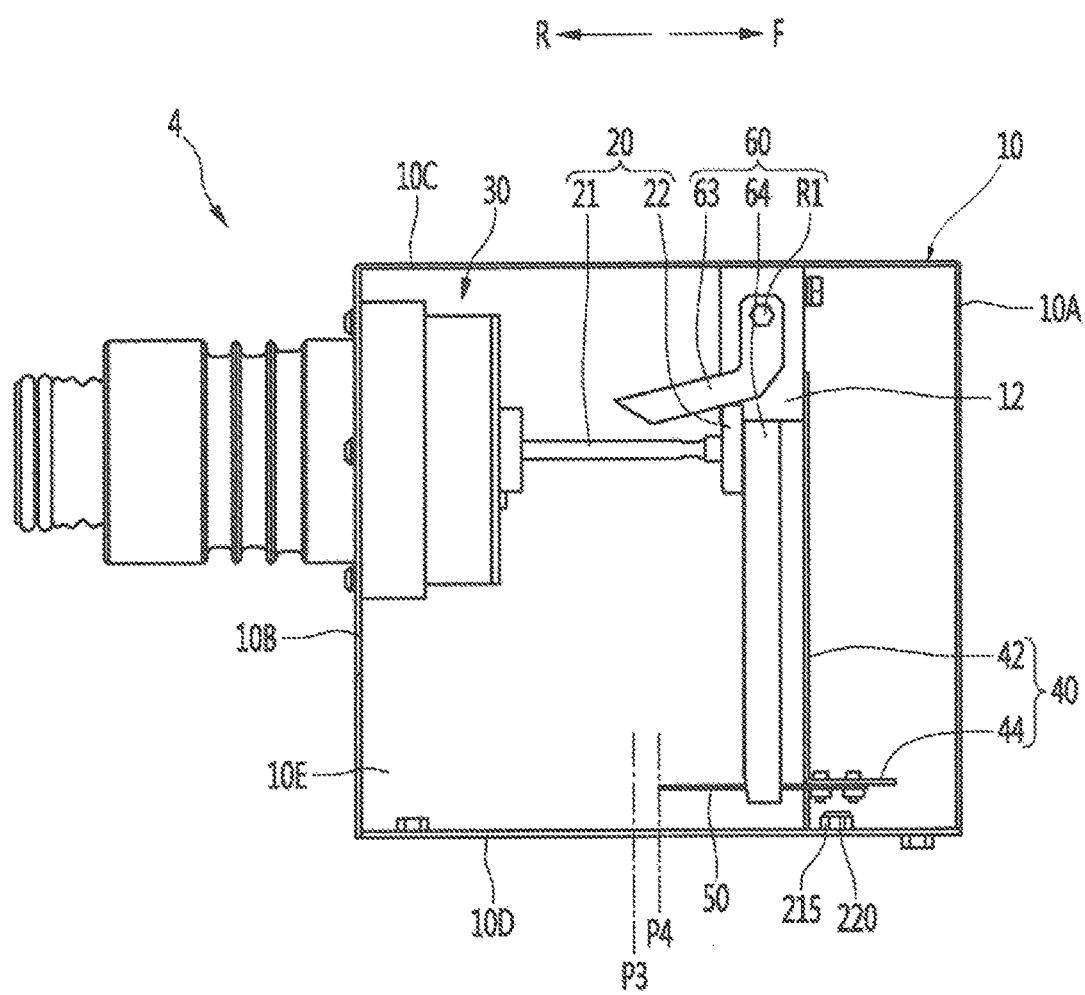
FIG. 13 is a side sectional view illustrating the inside of an arc eliminator body when a withdrawable arc eliminator having an interlock function according to an embodiment of the present invention is in an open state.
Figure 14:
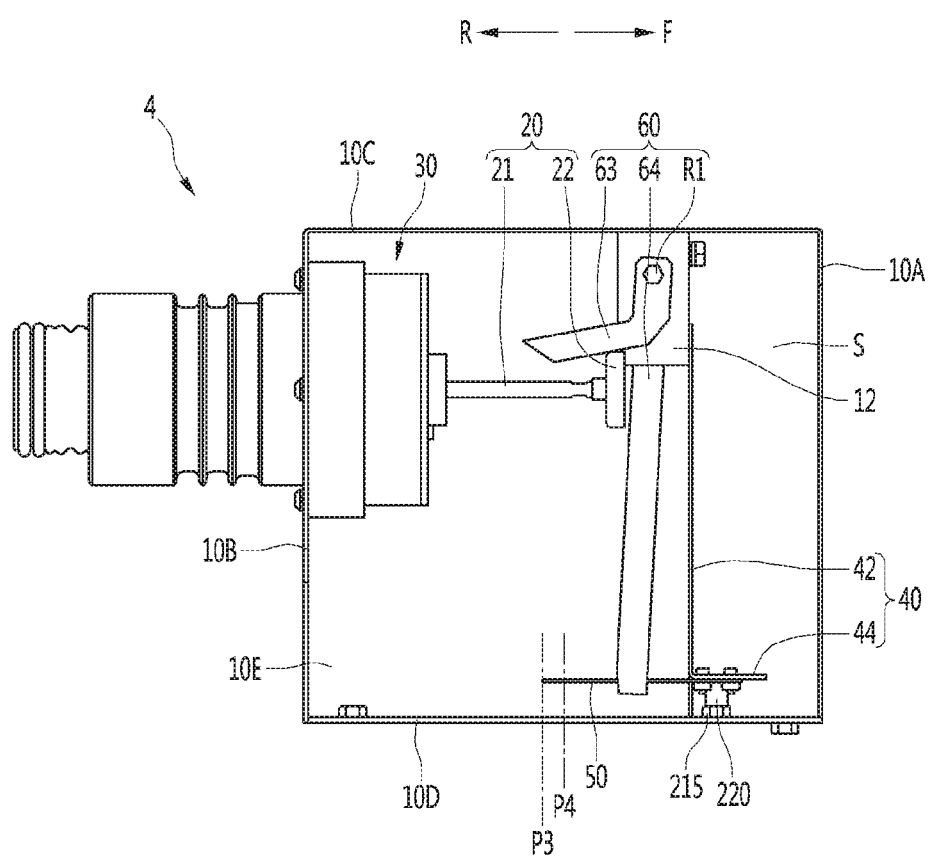
FIG. 14 is a side sectional view illustrating the inside of the arc eliminator body when the interlock device of a withdrawable arc eliminator according to an embodiment of the present invention is in a closed state.
Figure 15:
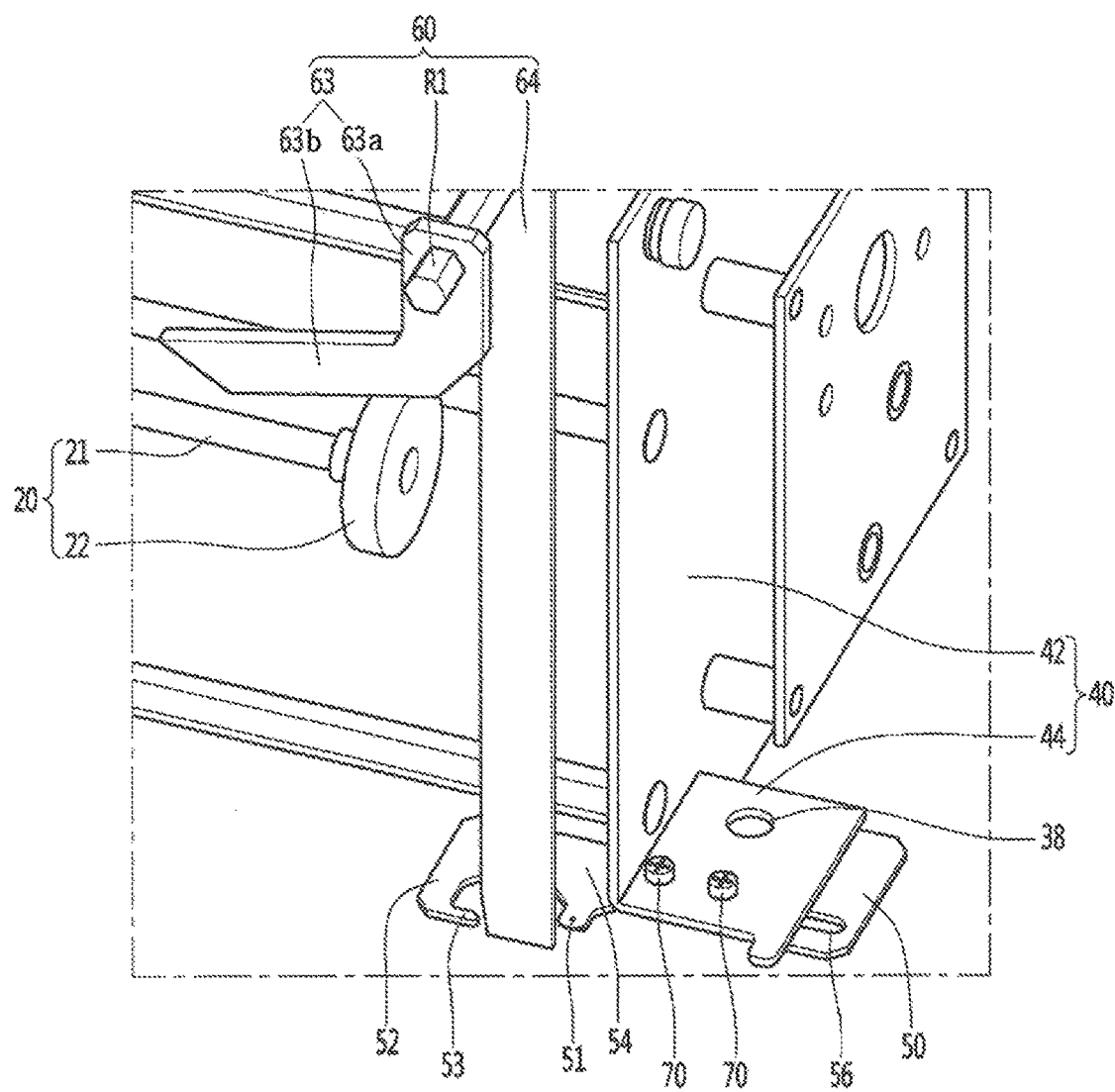
FIG. 15 is a perspective view illustrating a fixed body and an interlock body shown in FIG. 13, in an enlarged manner.
Figure 16:
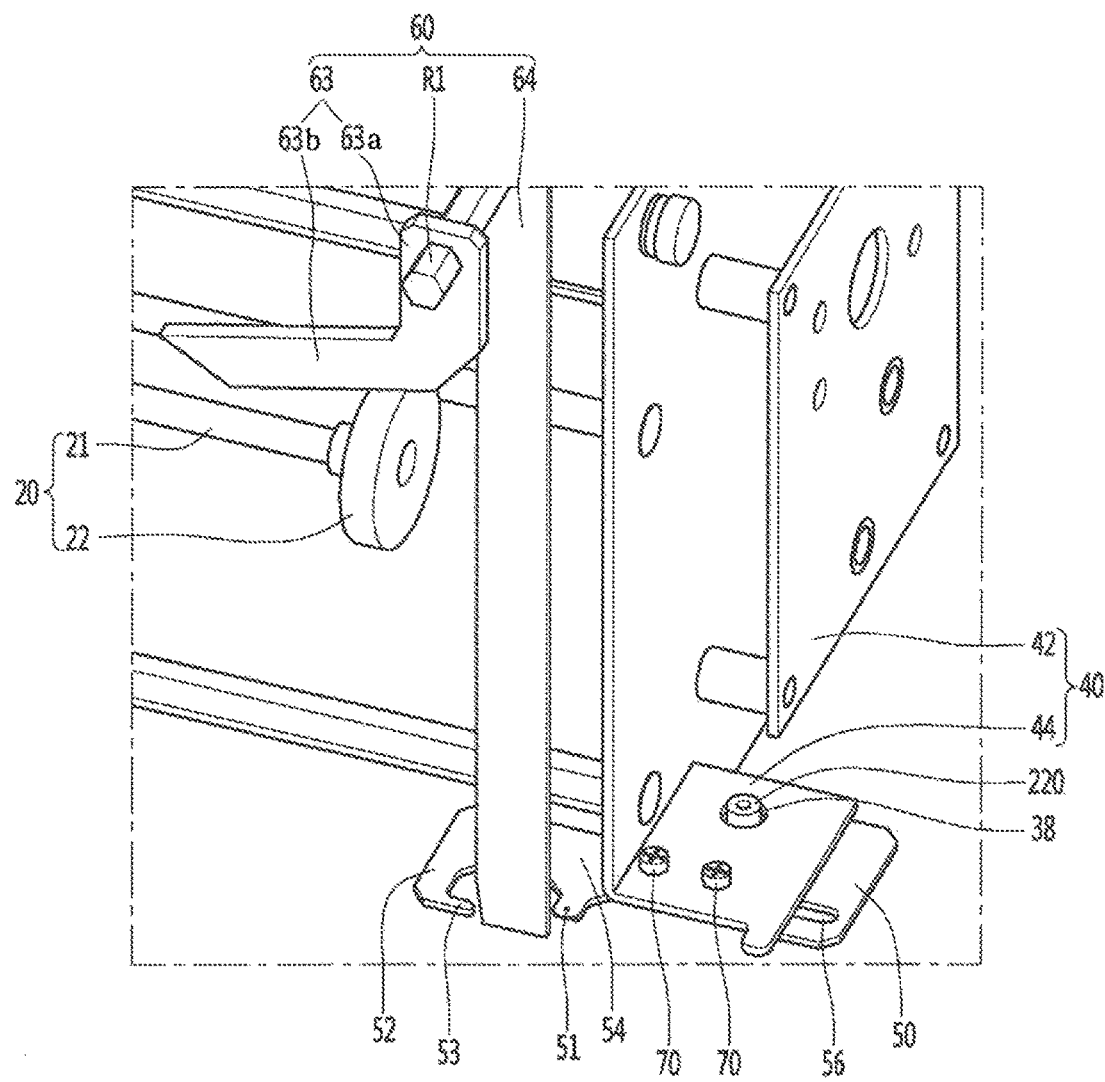
FIG. 16 is a perspective view illustrating that the movable pin has completely upward-moved to the fixed body shown in FIG. 14.
Figure 17:
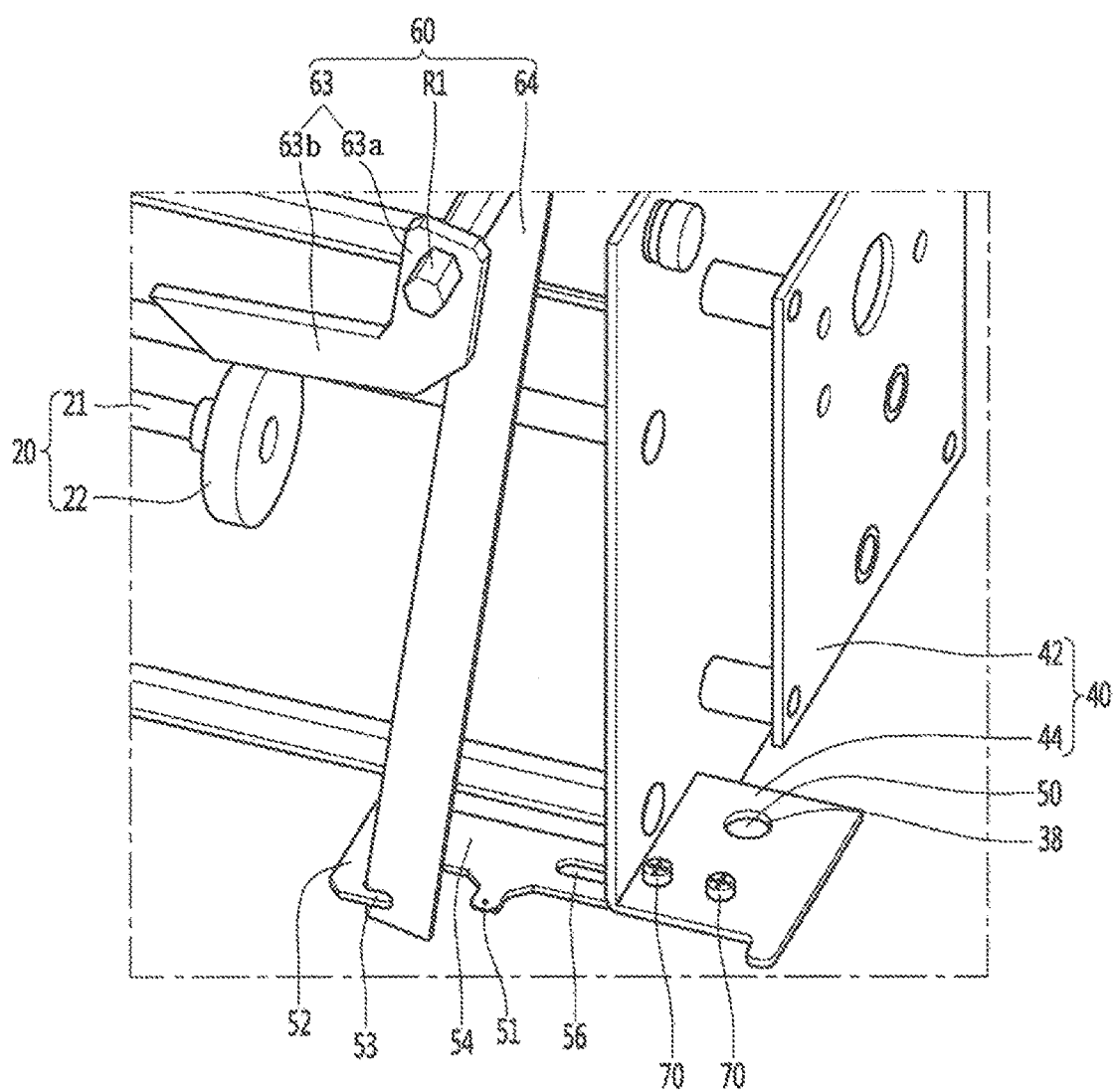
FIG. 17 is a perspective view illustrating that the interlock body shown in FIG. 13 has moved to a position for restricting an upward-movement of the movable pin.

FIG. 13 is a side sectional view illustrating the inside of an arc eliminator body when a withdrawable arc eliminator having an interlock function according to an embodiment of the present invention is in an open state. FIG. 14 is a side sectional view illustrating the inside of the arc eliminator body when the interlock device of a withdrawable arc eliminator according to an embodiment of the present invention is in a closed state. FIG. 15 is a perspective view illustrating a fixed body and an interlock body shown in FIG. 13, in an enlarged manner. FIG. 16 is a perspective view illustrating that the movable pin has completely upward-moved to the fixed body shown in FIG. 14. FIG. 17 is a perspective view illustrating that the interlock body shown in FIG. 13 has moved to a position for restricting an upward-movement of the movable pin.

The arc eliminator body 4 may include a housing 10, an arc extinguisher 30, a fixed body 40, an interlock body 50, and an interlock body moving member 60.

The housing 10 may have a space (S).

The arc extinguisher 30 may be installed at the housing 10. The arc extinguisher 30 may include the moving rod 20 disposed to move to the space (S) back and forth.

The fixed body 40 may be disposed at the space (S). An insertion opening 38, configured to insert the movable pin 220 thereinto, may be formed at the fixed body 40.

The interlock body 50 may be disposed to be moveable to a first position (P3) between the insertion opening 38 and the movable pin 220. And the interlock body 50 may be disposed to be moveable to a second position (P4) except for the first position (P3) between the insertion opening 38 and the movable pin 220.

The interlock body moving member 60 may be operated by interworking with the moving rod 20. The interlock body moving member 60 may move the interlock body 50 to the first position (P3) or the second position (P4).

Hereinafter, each component of the arc eliminator body 4 will be explained.

The housing 10 may form appearance of the arc eliminator body 4.

The housing 10 may include a front plate portion 10A, a rear plate portion 10B, an upper plate portion 10C, a lower plate portion 10D, and side plates portion 10E.

Figure 20:
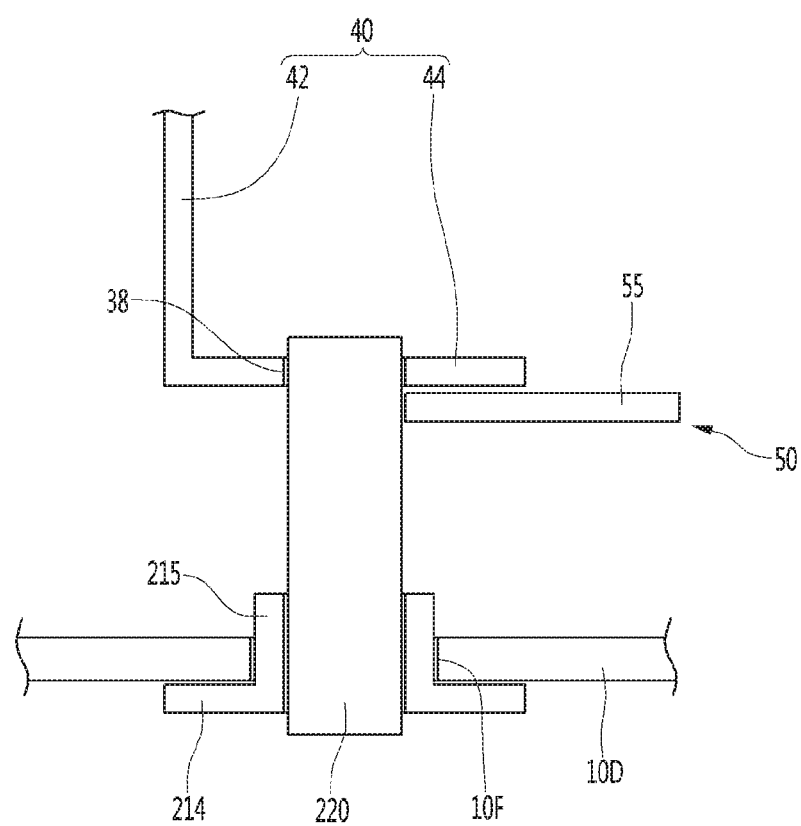
FIG. 20 is a sectional view taken along line 'A-A' in FIG. 18.
Figure 21:
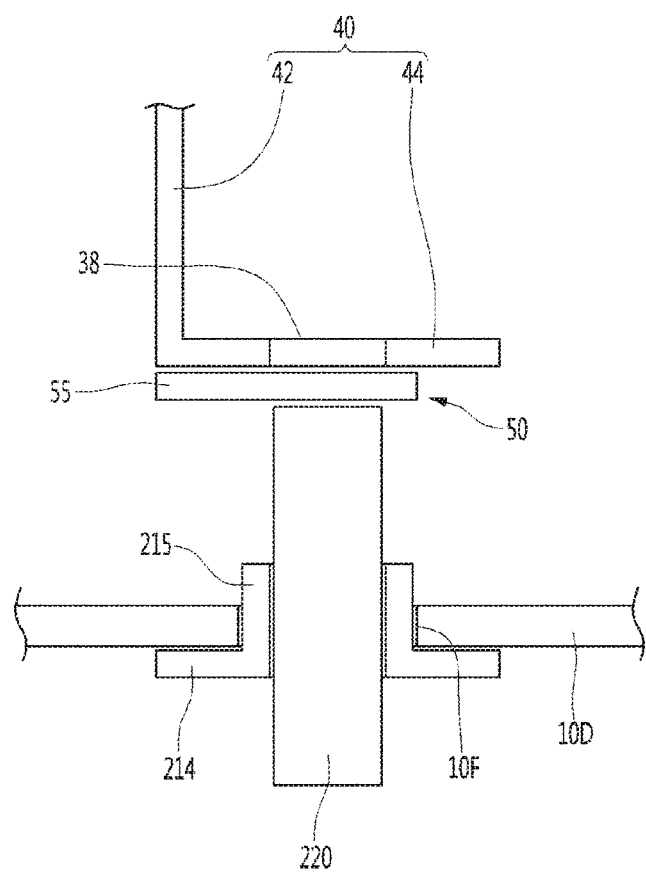
FIG. 21 is a sectional view taken along line 'B-B' in FIG. 19.

As shown in FIGS. 20 and 21, a lower through hole 10F, through which the movable pin guide 214 configured to guide an upward-and-downward movement of the movable pin 220 passes, may be formed at the lower plate portion 10D of the housing 10. The upper guide 215 of the movable pin guide 214 may be disposed to pass through the lower through hole 10F formed at the lower plate portion 10B of the housing 10. And the movable pin 220 may upward-move to protrude to the space (S) in a supported state by the movable pin guide 214.

The moving rod 20 may include a rod 21 protruding from the arc extinguisher 30 toward the space (S), and a contact body 22 disposed at one side of the rod 21.

The rod 21 may protrude to the space (S) by passing through the arc extinguisher 30.

The contact body 22 may be disposed to contact the interlock body moving member 60, and may rotate the interlock body moving member 60 such that the interlock body moving member 60 moves the interlock body 50 back and forth.

The arc extinguisher 30 may be formed to extinguish an arc. The arc extinguisher 30 may be disposed to pass through the rear plate portion 10B of the housing 10. The arc extinguisher 30 may be disposed such that its front part may be disposed in the space (S), and its rear part may be disposed at a rear side of the rear plate portion 10B.

The fixed body 40 may include a first body part 42 disposed at the space (S), and a second body part 44 formed at the first body part 42 and having the insertion opening 38 which is disposed above the movable pin 220.

The first body part 42 may be disposed in the space (S) in a vertical state. The first body part 42 may be formed to have a plate shape. An upper end of the first body part 42 may be coupled to the housing 10, or a rotation shaft supporter 12 to be explained later. The first body part 42 may be coupled to the upper plate portion 100 of the housing 10 or the rotation shaft supporter 12, by a coupling member such as a screw.

The second body part 44 may be horizontally-bent from a lower region of the first body part 42. The second body part 44 may be disposed to face the lower plate portion 10D of the housing 10. The second body part 44 may be spaced from the lower plate portion 10D of the housing 10. The movable pin 220, disposed at a lower part of the housing 10 so as to be moveable up and down, may upward-move from a lower side of the insertion opening 38 of the second body part 44, thereby being inserted into the inserting opening 38.

The interlock body moving member 60 may include a link 60 configured to move the interlock body 50 to the first position (P3) when the arc extinguisher 30 is in a closed state. For convenience, the interlock body moving member and the link will have the same reference numeral 60. The link 60 may be rotatably installed at the housing 10.

The link 60 may include a rotation shaft (R1), a first link 63 installed at the rotation shaft (R1) so as to contact an outer end of the contact body 22, and a second link 64 installed at the rotation shaft (R1) and configured to move the interlock body 50 back and forth.

The first link 63 may include a rotation shaft connection portion 63a connected to the rotation shaft (R1), and a bending portion 63b bent from the rotation shaft connection portion 63a to be disposed on the contact body 22, and rotated by the contact body 22.

The rotation shaft supporter 12 having a through hole for rotatably passing the rotation shaft (R1) therethrough, may be disposed at the housing 10. The rotation shaft supporter 12 may be a link supporter configured to rotatably support the link 60.

The rotation shaft supporter 12 may be installed so as to be positioned at an inner upper part of the housing 10. The rotation shaft supporter 12 may be installed at the upper plate portion 100 of the housing 10. The rotation shaft supporter 12 may be installed at the upper plate portion 10C of the housing 10, so as to protrude downward. A through hole may be formed at the rotation shaft supporter 12, so as to be open right and left.

The second link 64 may be disposed in the arc eliminator body 4, so as to be long up and down. An upper part of the second link 64 may be connected to the rotation shaft (R1) so as to be rotated integrally with the rotation shaft (R1), and a lower part of the second link 64 may long-extend to a rear side of the second body part 44.

Figure 18:
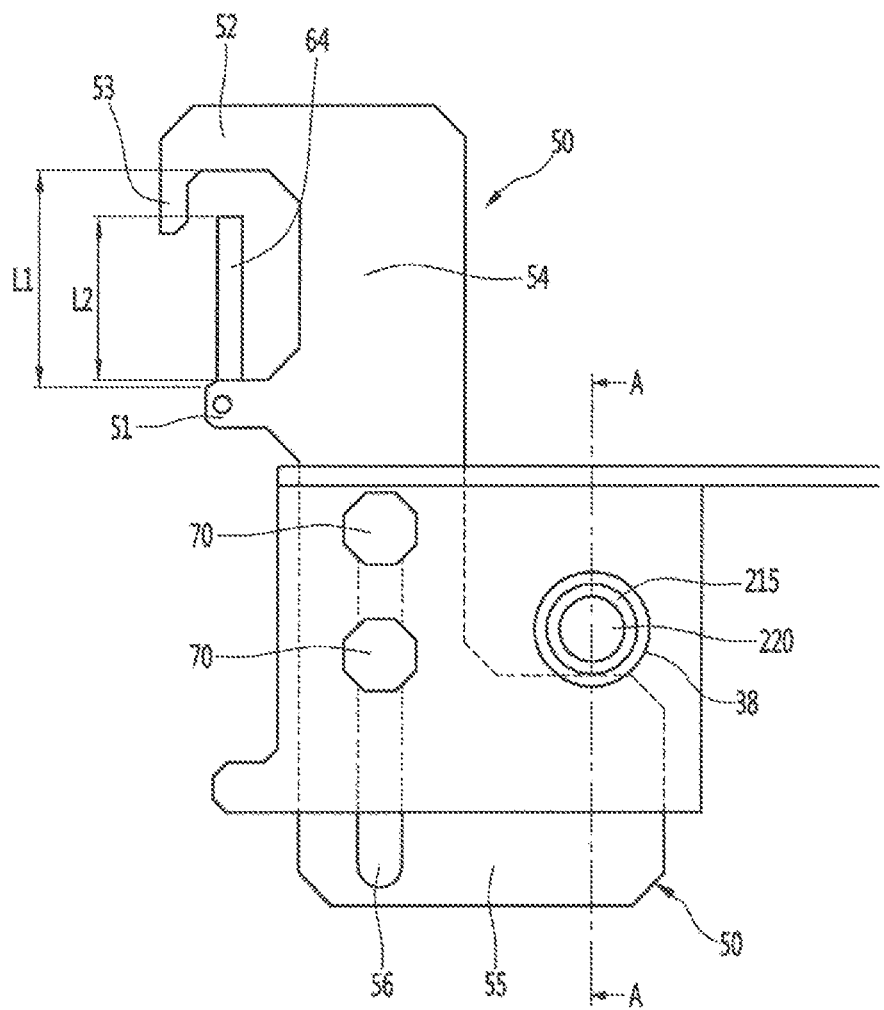
FIG. 18 is a planar view illustrating that the movable pin has completely upward-moved to the fixed body shown in FIG. 14.
Figure 19:
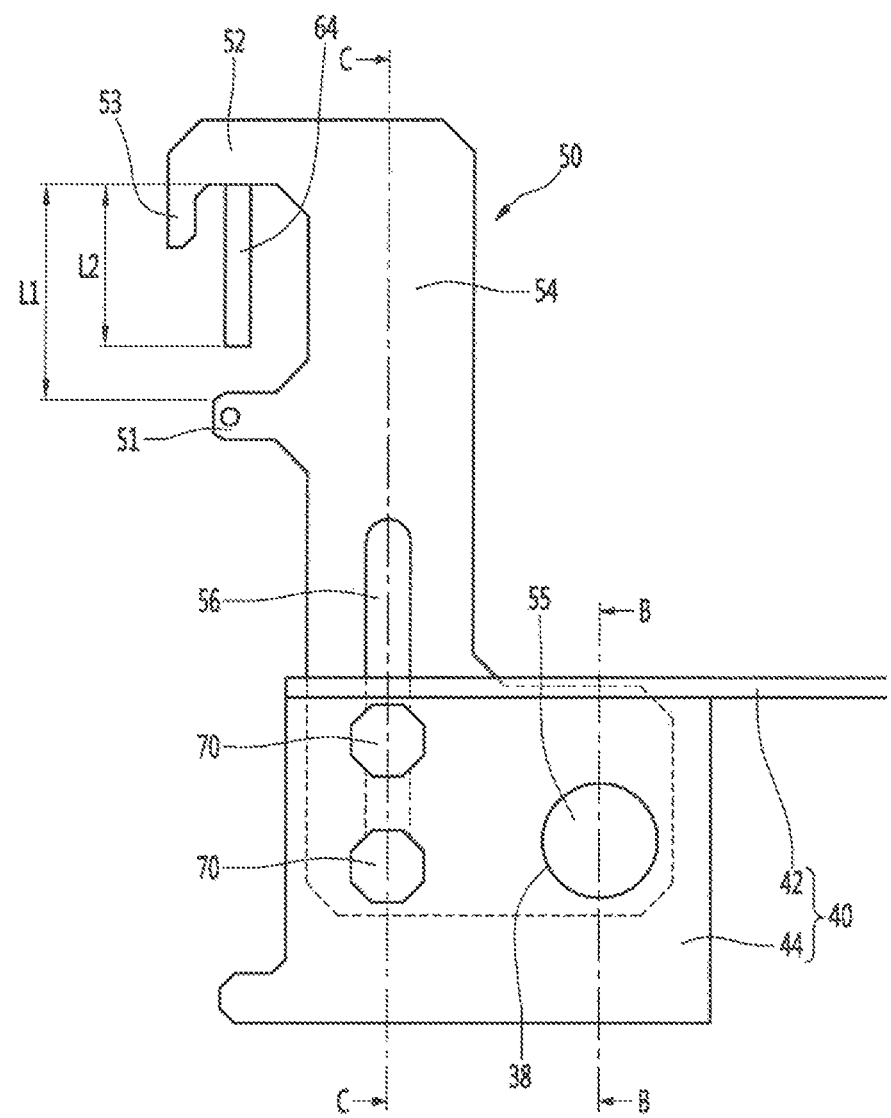
FIG. 19 is a planar view illustrating that the interlock body shown in FIG. 14 has moved to a position for restricting an upward-movement of the movable pin.

FIG. 18 is a planar view illustrating that the movable pin has completely upward-moved to the fixed body shown in FIG. 14. FIG. 19 is a planar view illustrating that the interlock body shown in FIG. 14 has moved to a position for restricting an upward-movement of the movable pin. FIG. 20 is a sectional view taken along line 'A-A' in FIG. 18. FIG. 21 is a sectional view taken along line 'B-B' in FIG. 19.

The interlock body 50 may include a fore end contact portion 51 contacting a front part of the end of the second link 64, and a rear end contact portion 52 contacting a rear part of the end of the second link 64. The interlock body 50 may further include a protrusion 53. The interlock body 50 may further include a guide portion 54 guided to the fixed body 40. The interlock body 50 may further include a movable pin contact portion 55 contacting an upper end of the movable pin 220 when the movable pin 220 moves upward.

A distance (L1) between the fore end contact portion 51 and the rear end contact portion 52 may be greater than a front and rear width (L2) of the end of the second link 64.

If the distance (L1) between the fore end contact portion 51 and the rear end contact portion 52 is equal to the front and rear width (L2) of the end of the second link 64, the second link 64 which is rotated may not smoothly interwork with the interlock body 50 which is moved back and forth.

On the other hand, if the distance (L1) between the fore end contact portion 51 and the rear end contact portion 52 is greater than the front and rear width (L2) of the end of the second link 64, the second link 64 which is rotated about the rotation shaft (R1) may smoothly move, back and forth, the interlock body 50 guided to the fixed body 40.

The protrusion 53 may protrude from one of the fore end contact portion 51 and the rear end contact portion 52, and may be spaced apart from another of the fore end contact portion 51 and the rear end contact portion 52. The protrusion 53 may restrict arbitrary separation of the second link 64 disposed between the fore end contact portion 51 and the rear end contact portion 52.

The fore end contact portion 51 and the rear end contact portion 52 may protrude from the guide portion 54, and the protrusion 53 may long-protrude in parallel to a lengthwise direction of the guide portion 54.

The fore end contact portion 51, the rear end contact portion 52, the protrusion 53, and the guide portion 54 may be disposed to enclose part of the second link 64.

The fore end contact portion 51 and the rear end contact portion 52, the protrusion 53, and the guide portion 54 may form a space to accommodate therein part of the second link 64, and the second link 64 may enter the space in an inclined state. Then, the second link 64 having completely entered the space may move the interlock body 50 back and forth.

The movable pin contact portion 55 may be formed to protrude from the guide portion 54. The guide portion 54 may be formed to be longer than the movable pin contact portion 55 back and forth.

The arc eliminator 1 may further include one or more interlock body guides 70 installed at the fixed body 40 and configured to guide a linear movement of the interlock body 50.

A slit 56, guided by the interlock body guide 70, may be long-formed at the interlock body 50. The slit 56 may be formed at the guide portion 54 of the interlock body 50 to be long back and forth. The slit 56 may be formed at the guide portion 54 of the interlock body 50, in a penetrating manner up and down.

Figure 22:
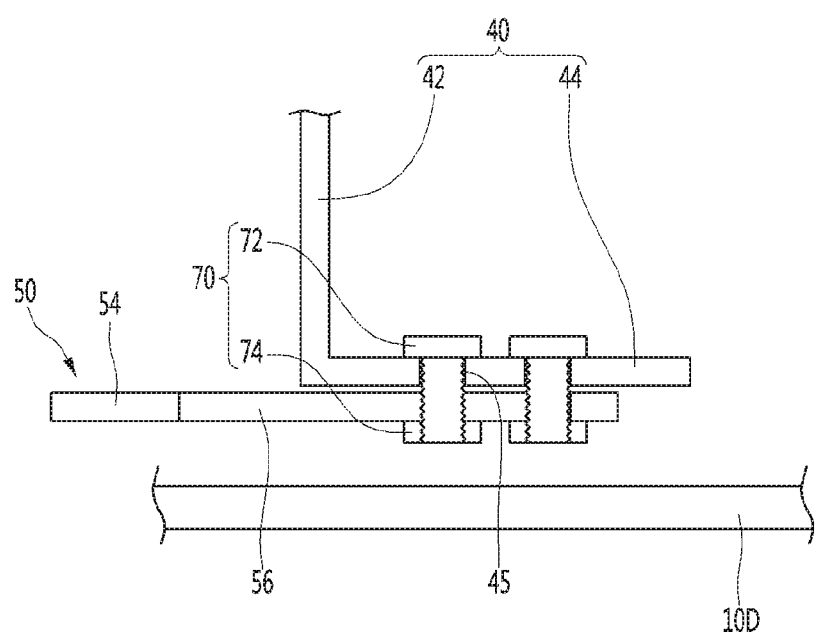
FIG. 22 is a sectional view taken along line 'C-C' in FIG. 19.

FIG. 22 is a sectional view taken along line 'C-C' in FIG. 19.

The interlock body guide 70 may be disposed to pass through the fixed body 40 and the slit 56.

The interlock body guide 70 may include a guide member 72 formed to pass through a hole 45 of the fixed body 40 and the slit 56, and a coupling member 74 coupled to the guide member 72 having passed through the hole 45 and the slit 56.

The guide member 72 may be formed as a bolt, and the coupling member 74 may be formed as a nut.

The interlock body guide 70 may be installed at the fixed body 40 in plurality in number, and the plurality of interlock body guides 70 may be spaced from each other in parallel to a lengthwise direction of the slit 56.

Hereinafter, an operation of the interlock device for a withdrawable arc eliminator according to the present invention will be explained.

Firstly, when the arc eliminator 1 is in an open state, that is, when the movable electrode 150 is separated from the high voltage electrode 140, the arc extinguisher 30 of the arc eliminator body 4 may have a configuration where the moving rod 20 moves in a forward direction (F) as shown in FIG. 13.

When the moving rod 20 moves forward, the second link 64 may be disposed to be long up and down in a state where the first link 63 is disposed on the contact body 22 of the moving rod 20. In this case, the interlock body 50 may be disposed at the second position (P4) not to block a space between the insertion opening 38 of the fixed body 40 and the movable pin 220.

When the arc eliminator 1 is in an open state, a user may insert the handle 300 shown in FIG. 10 into the handle inserting opening 242 shown in FIG. 9. And the handle 300 inserted into the handle inserting opening 242 may backward push the movable pin lifter 230 shown in FIGS. 8 and 11. The movable pin lifter 230 which moves backward may push the movable pin 220 upward, as shown in FIG. 12.

Since the movable pin 220 which has moved upward by the movable pin lifter 230 is not restricted by the interlock body 50, the movable pin 220 may be normally inserted into the insertion opening 38 of the fixed body 40, as shown in FIGS. 16 and 20.

When the movable pin 220 is inserted into the insertion opening 38, the movable pin lifter 230 may move backward by the handle 300 by a sufficient distance. And the protrusion 314 of the handle 300 may pass through the protrusion inserting opening 248 shown in FIG. 9.

A user may smoothly rotate the handle 300 in a state where the protrusion 314 of the handle 300 is not restricted to the front body 240 shown in FIGS. 8 and 9. When the handle 300 rotates, the insertion and withdrawal screw 200 may be normally rotated to move the truck 210 forward or backward.

That is, when the arc eliminator 1 is in an open state, a user may move the arc eliminator body 4 forward or backward.

When the arc eliminator 1 is in a closed state, that is, when the movable electrode 150 is in a contacted state to the high voltage electrode 140, the arc extinguisher 30 of the arc eliminator body 4 has a configuration where the moving rod 20 moves in a backward direction (R) as shown in FIG. 14. When the moving rod 20 moves backward, the link 60 may upward-rotate in a state where the first link 63 of the link 60 is disposed on the contact body 22 of the moving rod 20. In this case, the second link 64 may rotate in the same direction as the first link 63.

When the link 60 rotates, the link 60 may push the interlock body 50 in a rear direction (R). Here, the interlock body 50 may move to the first position (P3) to block a space between the insertion opening 38 of the fixed body 40 and the movable pin 220 is blocked, from the second position (P4) not to block the space between the insertion opening 38 of the fixed body 40 and the movable pin 220.

In a case where the arc eliminator 1 is in a closed state, a user may insert the handle 300 of FIG. 10 into the handle inserting opening 242 of FIG. 9. The handle 300 inserted into the handle inserting opening 242 may push the movable pin lifter 230 shown in FIGS. 8 and 11, in a rear direction. Then, the movable pin lifter 230 which moves backward may upward push the movable pin 220, as shown in FIG. 12.

The movable pin 220, which is moving upward by the movable pin lifter 230, contacts the interlock body 50 disposed below the insertion opening 38 of the fixed body 40, as shown in FIG. 21. The movable pin 220 is not inserted into the insertion opening 38 of the fixed body 40, in a blocked state by the interlock body 50.

If upward-movement of the movable pin 220 is restricted as above, the movable pin lifter 230 is not backward moved by the handle 300 any longer, and the handle 300 is not sufficiently inserted into the handle inserting opening 242.

The protrusion 314 of the handle 300 does not pass through the protrusion inserting opening 248 shown in FIG. 9, and is positioned in the protrusion inserting opening 248 at least partially. And the handle 300 is prevented from being inserted or rotated.

Since insertion and rotation of the handle 300 is restricted in a state where the protrusion 314 of the handle 300 is positioned in the protrusion inserting opening 248, a user's rotating the insertion and withdrawal screw 200 by rotating the handle 300 cannot be performed.

In this case, front and rear movements of the truck 210 by the insertion and withdrawal screw 200 are not executable, and the arc eliminator body 4 disposed on the truck 210 is restricted from moving back and forth.

That is, when the arc eliminator 1 is in a closed state, a user cannot move the arc eliminator body 4 back and forth. This may prevent an arc accident occurring when the arc eliminator body 4 moves back and forth in a closed state of the arc eliminator 1.

The interlock device of a withdrawable arc eliminator according to an embodiment of the present invention may have the following advantages.

Firstly, when the arc eliminator is in a closed state, a movement of the arc eliminator body through the handle is restricted. This may prevent an arc accident occurring when the arc eliminator body moves in a closed state of the arc eliminator.

Secondly, an arc accident may be prevented through a simple configuration of the interlock body and the interlock body moving member interworked with the moving rod.

Thirdly, separation of the interlock body moving member and the interlock body from each other may be prevented.

Fourthly, the interlock body may be moved stably with high reliability.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A withdrawable arc eliminator having an interlock function, comprising:
    an arc eliminator body; and
    a carriage module configured to move the arc eliminator body,
    wherein the carriage module includes:
    an insertion and withdrawal screw;
    a truck moved by the insertion and withdrawal screw;
    a movable pin installed at part of the truck so as to be moveable up and down; and
    a movable pin lifter backward-moved by being pushed by a handle for rotating the insertion and withdrawal screw, and configured to upward-move the movable pin, and
    wherein the arc eliminator body includes:
    a housing having a space;
    an arc extinguisher installed at the housing, and including a moving rod disposed to move to the space back and forth;
    a fixed body disposed at the space, and having an insertion opening for inserting the movable pin thereinto;
    an interlock body disposed to be moveable to a first position to block an area between the insertion opening and the movable pin, and a second position that does not block the area between the insertion opening and the movable pin;
    and an interlock body moving member operated by interworking with the moving rod, and configured to move the interlock body to the first position or the second position.

2. The withdrawable arc eliminator having the interlock function of claim 1, wherein the interlock body moving member includes a link configured to move the interlock body to the first position when the arc extinguisher is in a closed state.

3. The withdrawable arc eliminator having the interlock function of claim 2, wherein the link includes: a rotation shaft installed at the housing; a first link installed at the rotation shaft, and contacting an end portion of the moving rod; and a second link installed at the rotation shaft, and configured to move the interlock body back and forth.

4. The withdrawable arc eliminator having the interlock function of claim 3, wherein the interlock body includes: a fore end contact portion contacting a front part of an end portion of the second link; and a rear end contact portion contacting a rear part of the end portion of the second link, and wherein a distance between the fore end contact portion and the rear end contact portion is greater than a front and rear width of the end portion of the second link.

5. The withdrawable arc eliminator having the interlock function of claim 4, wherein the interlock body further includes a protrusion protruding from one of the fore end contact portion and the rear end contact portion, the protrusion spaced apart from another of the fore end contact portion and the rear end contact portion.

6. The withdrawable arc eliminator having the interlock function of claim 1, wherein the interlock body includes: a guide portion guided to the fixed body; and a movable pin contact portion protruding from the guide portion, and contacting an upper end of the movable pin when the movable pin moves upward, and wherein the guide portion is formed to be longer than the movable pin contact portion in a back and forth direction.

7. The withdrawable arc eliminator having the interlock function of claim 1, wherein the housing is provided with a lower through hole at a lower plate portion thereof, the lower through hole through which a movable pin guide for guiding an upward-and-downward movement of the movable pin passes.

8. The withdrawable arc eliminator having the interlock function of claim 1, wherein the fixed body includes: a first body part disposed at the space in a vertical state; and a second body part formed at a region of the first body part in a horizontal state, and having the insertion opening which is disposed above the movable pin.

9. The withdrawable arc eliminator having the interlock function of claim 1, further comprising one or more interlock body guides installed at the fixed body and configured to guide a linear movement of the interlock body.

10. The withdrawable arc eliminator having the interlock function of claim 9, wherein a slit, guided by the interlock body guide, is formed at the interlock body to be long in a back and forth direction.

* * * * *